(12) United States Patent  (10) Patent No.: US 8,505,605 B2
Byerley  (45) Date of Patent: Aug. 13, 2013

(54) TRANSFER RING WHICH RESISTS BACKDRIVING FORCES DURING A TIRE CONSTRUCTION PROCESS

(75) Inventor: Mark S. Byerley, Greenback, TN (US)

(73) Assignee: BPS Engineering, LLC, Greenback, TN (US)

( * ) Notice: Subject to any disclaimer, the term of this patent is extended or adjusted under 35 U.S.C. 154(b) by 332 days.

(21) Appl. No.: 12/806,299

(22) Filed: Aug. 10, 2010

(65) Prior Publication Data

US 2012/0037318 A1   Feb. 16, 2012

(51) Int. Cl.
*B29D 30/26* (2006.01)
(52) U.S. Cl.
USPC ..................................... 156/406.2; 156/126
(58) Field of Classification Search
USPC .................. 156/406.2, 126, 396, 403, 420
See application file for complete search history.

(56) References Cited

U.S. PATENT DOCUMENTS

| | | | | |
|---|---|---|---|---|
| 3,865,670 | A | * | 2/1975 | Habert ........................ 156/406.2 |
| 4,126,507 | A | * | 11/1978 | Kim et al. ..................... 156/415 |
| 4,239,565 | A | * | 12/1980 | Henley et al. ................. 156/126 |
| 5,071,498 | A | * | 12/1991 | Nishiide et al. ............... 156/132 |
| 5,156,713 | A | * | 10/1992 | Ishii et al. ..................... 156/396 |
| 5,441,587 | A | | 8/1995 | Byerley |
| 5,558,733 | A | | 9/1996 | Byerley |
| 5,709,768 | A | | 1/1998 | Byerley |
| 5,861,079 | A | * | 1/1999 | Morteyrol .................. 156/406.2 |

FOREIGN PATENT DOCUMENTS

GB          2092100 A    *   8/1982

* cited by examiner

*Primary Examiner* — Geoffrey L Knable
(74) *Attorney, Agent, or Firm* — Michael E. McKee

(57) ABSTRACT

A transfer ring for supporting a belt and tread package about a tire carcass for inflation of the carcass within the package during a tire-making process includes a plurality of shoes which are movable inwardly and outwardly for purposes of grasping or releasing a package positioned between the shoes. Components are provided for moving the shoes inwardly to a radial position about a package; and at this radial position, the shoes apply to the package a biasing force for maintaining a substantial uniform pressure about the package if it were to contract in size after the shoes are moved to the radial position. A braking arrangement is provided which prevents the shoes from moving outwardly of the radial position when a tire carcass is thereafter inflated within the package to thereby limit the diameter of the package during the carcass-inflating process.

18 Claims, 12 Drawing Sheets

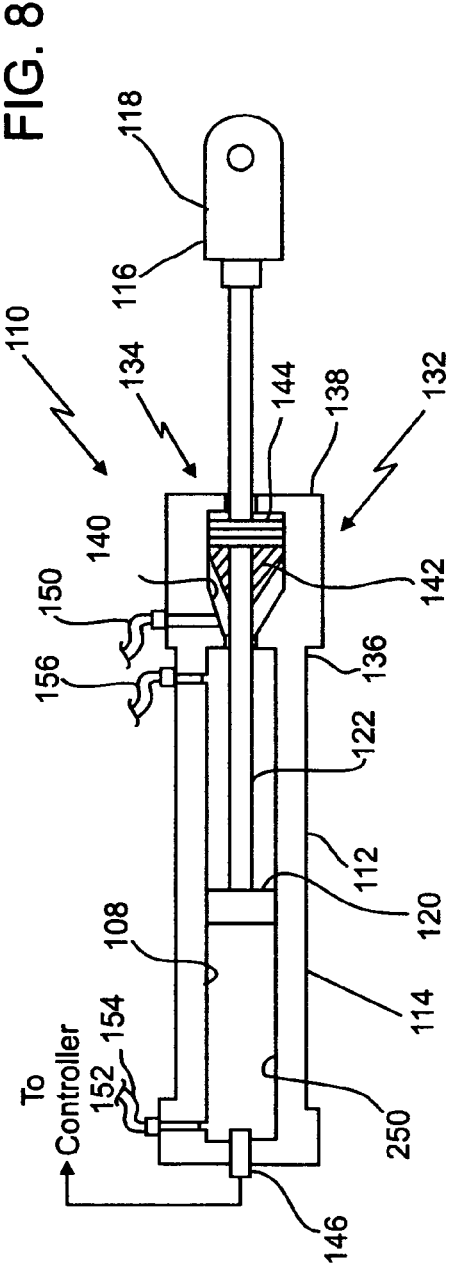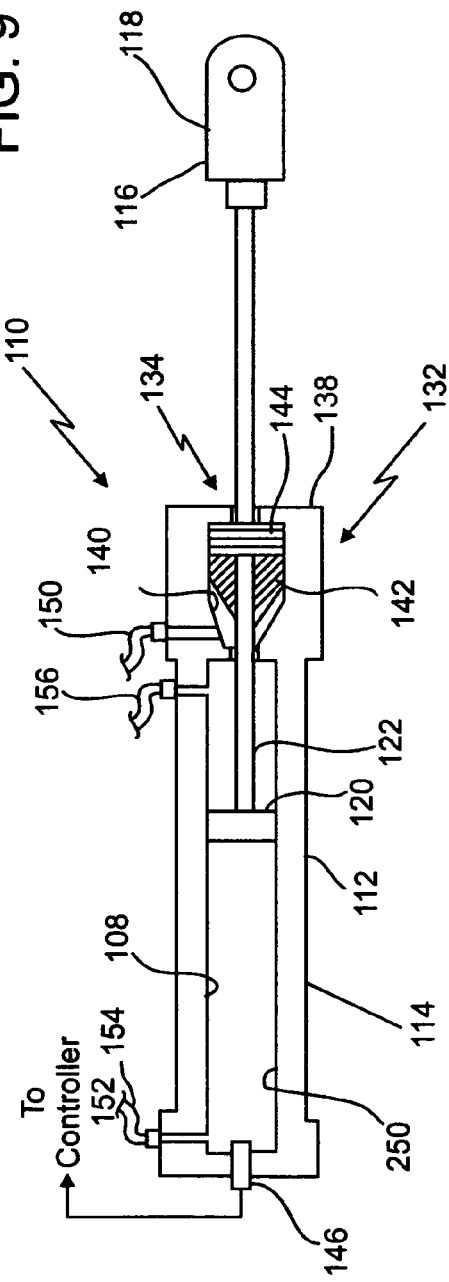

TRANSFER RING WHICH RESISTS BACKDRIVING FORCES DURING A TIRE CONSTRUCTION PROCESS

BACKGROUND OF THE INVENTION

This invention relates generally to the construction of vehicle tires and relates, more particularly, to a transfer ring used in a tire construction process.

During the construction of a vehicle tire, a tire carcass is built upon a first stage tire-building drum and transferred to a second stage drum (e.g. a shaping drum) where it awaits a belt and tread package of the vehicle tire to be positioned thereon. The belt and tread package is constructed on a separate drum (i.e. a belt and tread drum) and transferred, by way of a transfer ring, to the second stage drum upon which the carcass has already been positioned. While positioned about a belt and tread drum, the belt and tread package is encircled and grasped by the transfer ring, and the belt and tread drum is collapsed so that the belt and tread package is supported by the transfer ring for subsequent transfer to the second stage drum.

With the belt and tread package supported within the transfer ring, the package is placed around the tire carcass disposed about the second stage drum, and the tire carcass is subsequently inflated in a manner which urges the outer surface of the tire carcass against the interior of the belt and tread package to form a tire precursor which is later placed in a mold for final formation of the tire and its tread.

A transfer ring commonly includes a pair of stationary outer ring-shaped housing rings, an actuator ring disposed between the housing rings and a plurality of tire-grasping shoes which are positioned about so as to collectively define a substantially circular spacing between the shoes, and it is this circular spacing that accepts a belt and tread package when the transfer ring is moved over the package. Each of the shoes has a radially inwardly-facing surface which is movable radially inwardly and outwardly with respect to the circular spacing defined thereby for movement into and out of engagement with the outer circumference, or peripheral surface, of the belt and tread package. The shoes are supported by the outer housing rings and the actuator ring by way of a linkage system so that appropriate movement of the linkage system (by way of, for example, an air-actuated cylinder) effects the simultaneous movement of all of the shoes into or out of engagement with the outer circumference of the belt and tread package. An example of a transfer ring of the aforedescribed class and which is capable of grasping a belt and tread package for transference of the package to a position about a tire carcass is described in U.S. Pat. No. 5,441,587.

After positioning the transfer ring about a belt and tread package and moving its shoes into engagement with the belt and tread package, it is desirable that the package remains firmly grasped by the shoes as the package is transferred into position about a tire carcass positioned about the second stage drum. However, in some instances, the size (e.g. the diameter) of the package tends to contract due, for example, to hoop stress which may be induced within the package when constructed, and unless compensated for, such a contraction of the package size could relieve some of the grasping pressure being applied to the package by the shoes so that the package is permitted to deform to a deleterious shape.

After the belt and tread package has been transferred to a position about the carcass, the carcass is inflated against the interior surface of the belt and tread package to help join the carcass to the belt and tread package. In order that the rounded shape of the outer surface of the belt and tread package is maintained during the carcass-inflating process, the package continues to be grasped by the shoes as the carcass is inflated. However, radially outwardly-directed forces which are exerted against the shoes during the inflation of the carcass can be so great that the shoes tend to be displaced radially outwardly from their original position of engagement with the outer circumference of the belt and tread package. Such a radially outwardly-directed displacement, or shifting, of the shoes due to such outwardly-directed forces (referred to herein as backdriving forces) is a highly undesirable occurrence in that it promotes inaccuracies in the dimensions of the tire being constructed (i.e. permits the enlargement of the belt and tread package beyond a desired diameter) and can promote damage to various components of the transfer ring which oppose the backdriving forces.

It would therefore be desirable to provide a transfer ring having an improved means for resisting backdriving forces generated during a tire carcass-inflating operation which tend to urge the package grasping-shoes radially outwardly of the position assumed by the shoes when initially placed into grasping relationship with the belt and tread package yet accommodates, if necessary, a contraction of the belt and tread package between the moment that the package is initially grasped by the shoes and the carcass-inflating step while the shoes maintain a substantially uniform grasping pressure about the belt and tread package.

Accordingly, it is an object of the present invention to provide a new and improved transfer ring of the aforedescribed class which both resists backdriving forces generated during a tire carcass-inflating operation so that the shoes which are grasped about the belt and tread package are not shifted radially outwardly of the position assumed by the shoes when initially placed into grasping relationship with a belt and tread package and accommodates a contraction of the belt and tread package after the package has been initially grasped by the shoes.

Another object of the present invention is to provide such a transfer ring which positively limits any radially outwardly-directed expansion of the belt and tread package during a carcass-inflating operation to the diameter possessed by the belt and tread package when initially grasped by the package-grasping shoes to promote dimensional accuracy within the tire being constructed.

Yet another object of the present invention is to provide such a transfer ring which utilizes a novel braking scheme for preventing undesired backdriving of the package-grasping shoes during a carcass-inflating process.

Still another object of the present invention is to provide such a transfer ring whose package-engaging shoes apply an amount of radially inwardly-directed biasing force upon the belt and tread package when placed in desired grasping relationship with the package to maintain a substantially uniform grasping pressure about the package even if the package were to contract in size after the package has been initially grasped by the shoes.

Yet another object of the present invention is to provide such a transfer ring having an improved means for joining the shoes of the transfer ring to one another to help ensure that the shoes act in unison during use of the transfer ring.

A further object of the present invention is to provide such a transfer ring which is uncomplicated in structure, yet effective in operation.

SUMMARY OF THE INVENTION

This invention resides in an improvement in a transfer ring for supporting a belt and tread package in position about a tire carcass during a tire construction process as the tire carcass is inflated within the interior of the belt and tread package. The transfer ring includes a plurality of shoes positionable about the belt and tread package and which are movable radially inwardly and outwardly relative to the belt and tread package for purposes of grasping and releasing the outer circumference of the belt and tread package.

The improvement includes means for moving the shoes radially inwardly to a radial position about the outer circumference of a belt and tread package positioned within the transfer ring so that when in the radial position, the outer circumference of the belt and tread package is biased radially inwardly by the shoes so that in the event that the belt and tread package contracts in diameter following the movement of the shoes into the radial position, the shoes are moved radially inwardly of the belt and tread package to maintain a substantially uniform grasping force about the belt and tread package. In addition, there are provided means for preventing the shoes from moving radially outwardly of the radial position when a tire carcass is inflated within the interior of the belt and tread package grasped by the shoes to thereby prevent the diameter of the belt and tread package from enlarging beyond a desired diameter.

BRIEF DESCRIPTION OF THE DRAWINGS

FIGS. 8-10 are longitudinal cross-sectional views illustrating schematically the cylinder assembly of the FIG. 1 transfer ring and the positions of various components of the cylinder assembly during sequential stages of operation of the transfer ring.

DETAILED DESCRIPTION OF AN ILLUSTRATIVE EMBODIMENT

Figure 1:
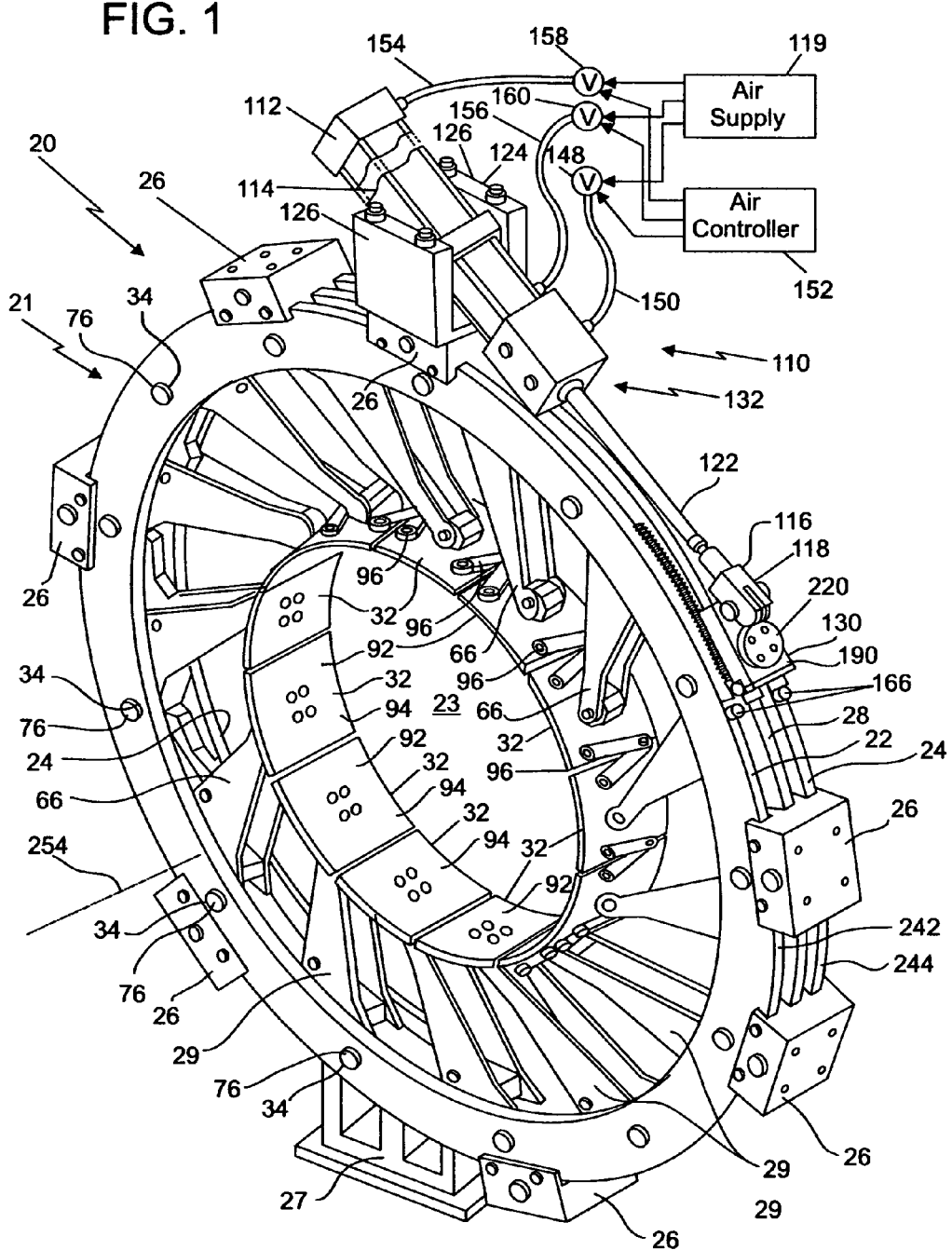
FIG. 1 is a perspective view of a transfer ring within which features of the present invention are incorporated and which shows the package-engaging shoes of the transfer ring in a radially inwardmost, or collapsed, position.
Figure 2:
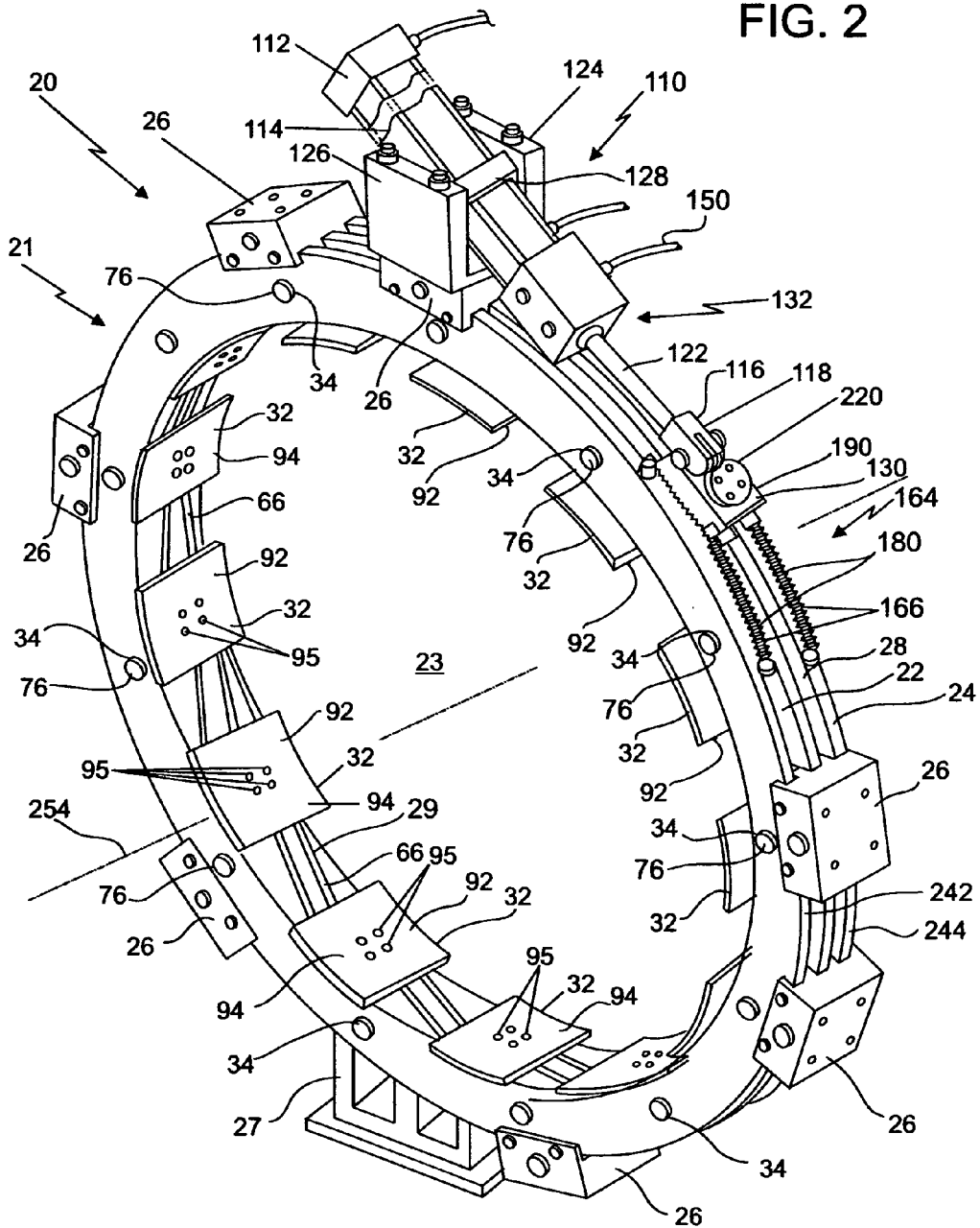
FIG. 2 is a view similar to that of FIG. 1 but showing the package-engaging shoes of the transfer ring in a radially ourwardmost, retracted, position.
Figure 3:
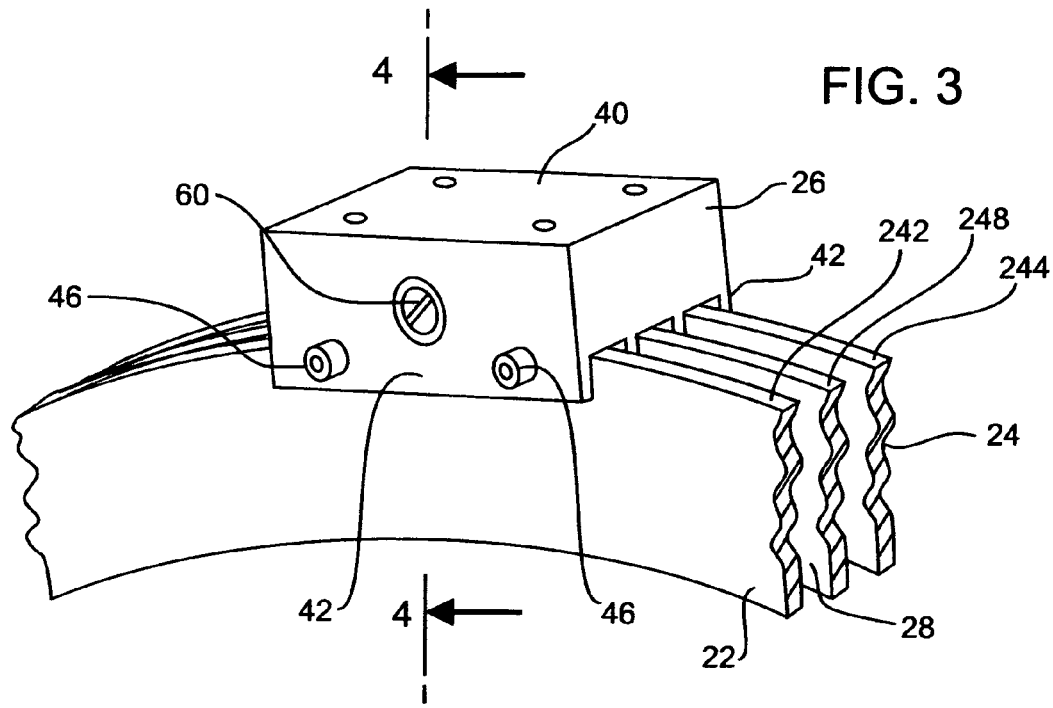
FIG. 3 is a perspective view of a fragment of the FIG. 1 transfer ring.
Figure 4:
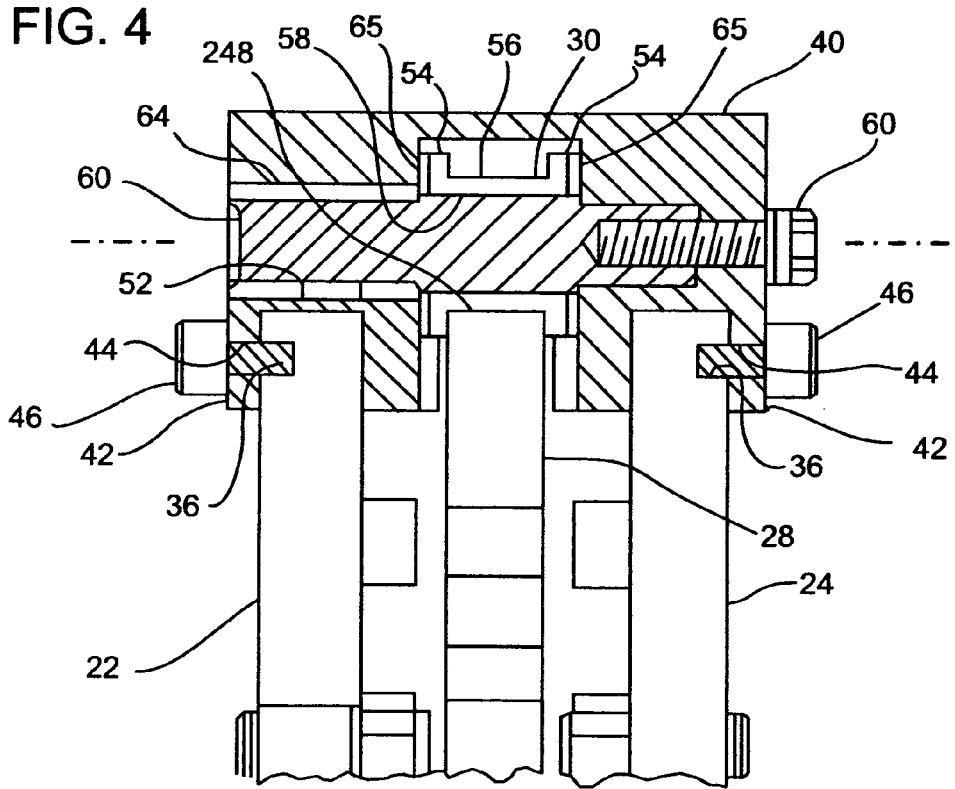
FIG. 4 is a cross-sectional view taken about on line 4-4 of FIG. 3.

Turning now to the drawings in greater detail and considering first FIGS. 1 and 2, there is illustrated an embodiment, generally indicated 20, of a transfer ring which is used during the manufacture of vehicle tires and which embodies features of the present invention. More specifically, the transfer ring 20 is positionable about a belt and tread package (not shown) built upon a first stage tire-building drum, and a plurality of shoes are used to grasp the belt and tread package for transport to a position about a tire carcass which is supported about a second stage drum (e.g. a shaping drum). While the belt and tread package remains grasped by the shoes 32 of the transfer ring 20, the tire carcass is subsequently inflated in a manner which urges the outer surface of the tire carcass against the interior of the belt and tread package to form a tire precursor which is later placed in a mold for final formation of the tire and its tread. It is during the carcass-inflating process that relatively large outwardly-directed forces are generated which urge the shoes 32 radially outwardly with respect to the spacing defined between the shoes 32. These outwardly-directed forces which urge the shoes 32 to move radially outwardly with respect to the center of the transfer ring 32 are referred to herein as backdriving forces and are successfully resisted by the transfer ring 20 so that the desired outer dimensions (i.e. the diameter) of the belt and tread package (included as part of the resulting tire precursor formed by the inflation of the tire carcass against the interior surfaces of the belt and tread package) are maintained.

For the aforedescribed purposes, the transfer ring 20 includes a frame structure, generally indicated 21, and a plurality of package-engaging shoes 32 which are supported from the frame structure 21 for collective movement radially inwardly of the frame structure 21 and into grasping engagement with the outer circumference of a belt and tread package and for collective movement radially outwardly of the frame structure 21 for release of the belt and tread package following inflation of a tire carcass within the interior of the belt and tread package. As best viewed in FIGS. 1 and 2, the plurality of shoes 32 collectively define a spacing 23 (whose outer shape is substantially circular) within the frame structure 21 whose size (i.e. its diameter as measured across the spacing 23) is altered as the shoes 32 are collectively moved radially inwardly or outwardly of the frame structure 21 between a condition as illustrated in FIG. 1 at which the shoes 32 are in a fully collapsed, or radially inwardmost, position relative to the circular spacing 23 and between a condition as illustrated in FIG. 2 at which the shoes 32 are in a fully retracted, or radially outwardmost, position relative to the circular spacing 23.

With reference to FIGS. 1-4, the frame structure 21 of the transfer ring 20 includes first and second outer housing rings 22 and 24 which are held in spaced and parallel relationship by a plurality of clamping assemblies 26 spaced about the perimeter of the housing rings 22, 24 and an actuator ring 28 which is disposed between the housing rings 22 and 24. The actuator ring 28 is rotatably mounted between the housing rings 22 and 24 for rotation relative thereto about the central axis, indicated 254 in FIGS. 1 and 2, of the transfer ring 20 by means of a plurality of bearings 30 (e.g. needle bearings) which are mounted within the clamping assemblies 26. As will be apparent herein, the movement of the shoes 32 radially inwardly or outwardly relative to the circular spacing 23 between, for example, the collapsed position of FIG. 1 and the retracted position of FIG. 2 is effected as the actuator ring 28 is rotated relative to the housing rings 22, 24 between alternative angular positions. In addition, the housing rings 22 and 24 are provided with appropriate mounting means 27 (FIGS. 1 and 2) for mounting of the transfer ring 20 on a vehicle tire manufacturing machine.

Figure 11:
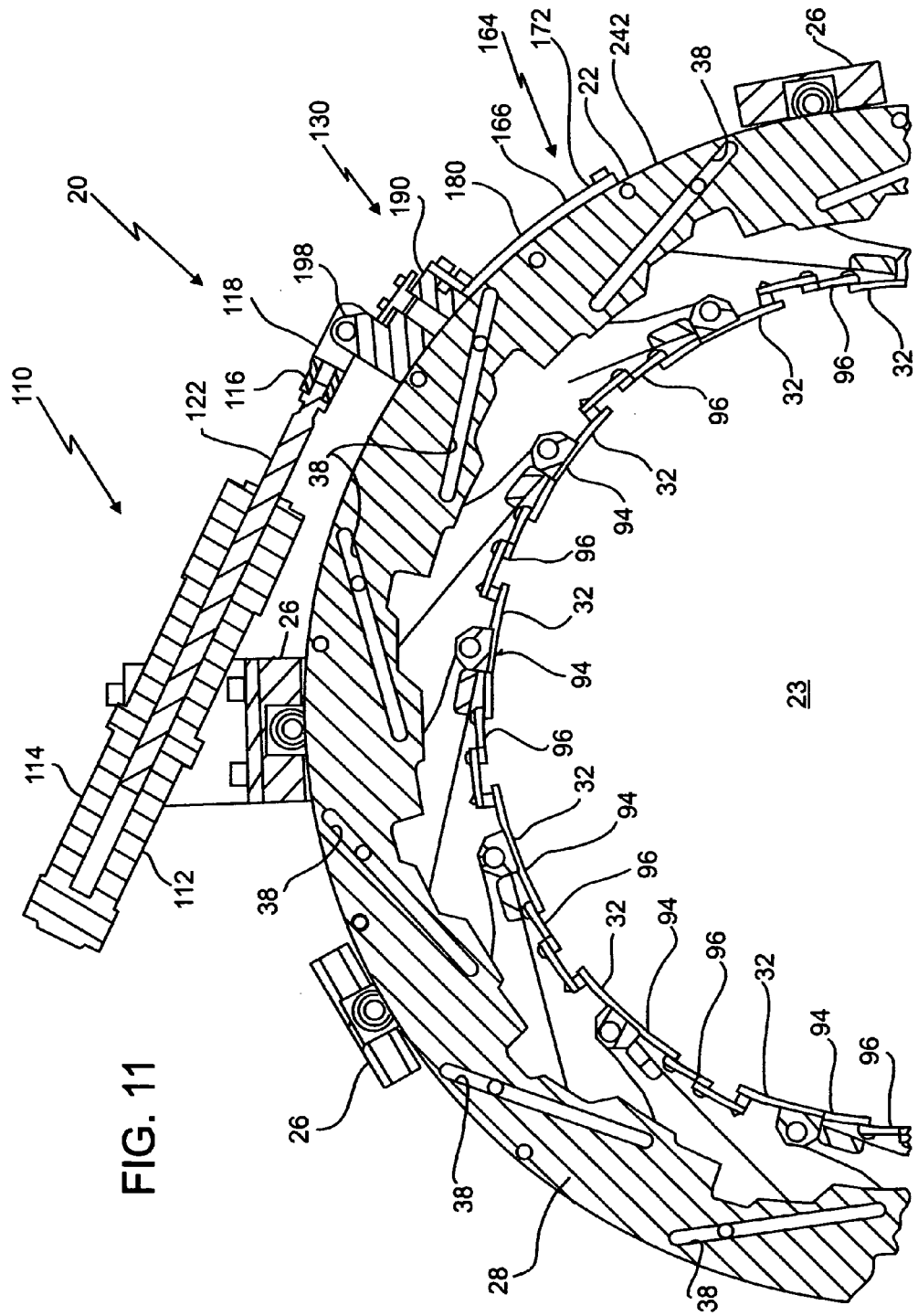
FIG. 11 is a longitudinal cross sectional view of a major portion of the FIG. 1 transfer ring.

Each housing ring 22 or 24 and the actuator ring 28 is constructed of a rigid material, such as steel, and is substantially planar in form and has a relatively small thickness as measured between its opposite sidewalls. Moreover, each of the rings 22, 24 or 28 possesses an uncomplicated structure, such as smooth sidewalls and a radially outwardly-facing perimeter edge of cylindrical form, which facilitates the manufacture of these components. For attachment of a shoe-supporting linkage system 29 (described herein) to the housing rings 22 and 24, each ring 22 or 24 includes a plurality of transversely-extending bores 34 which are regularly-spaced about the sidewalls of the rings 22, 24, and for attachment of the clamping assemblies 26 to the housing rings 22 and 24, each of the housing rings 22 and 24 includes a plurality of spaced-apart pairs of circular recesses 36 (FIG. 4) which open out of the outer sidewalls of the housing rings 22, 24. In addition and for purposes of cooperating with the shoe-supporting linkage system 29 for movement of the shoes 32 radially inwardly and outwardly of the circular spacing 23, the actuator ring 28 defines a series of angularly-oriented slots 38 (best shown in FIGS. 8 and 11) which are spaced therearound and which extend between the opposite sidewalls of the actuator ring 28.

Figure 5:
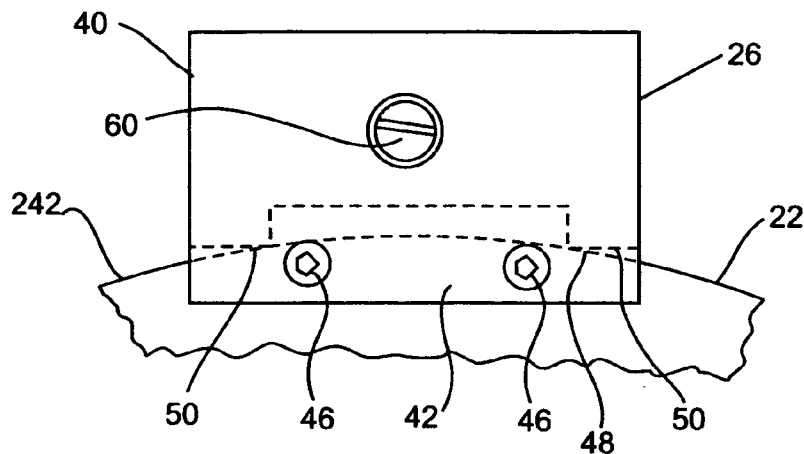
FIG. 5 is a side elevational view of the fragment shown in FIG. 3 as seen generally from the left in FIG. 3.
Figure 6:
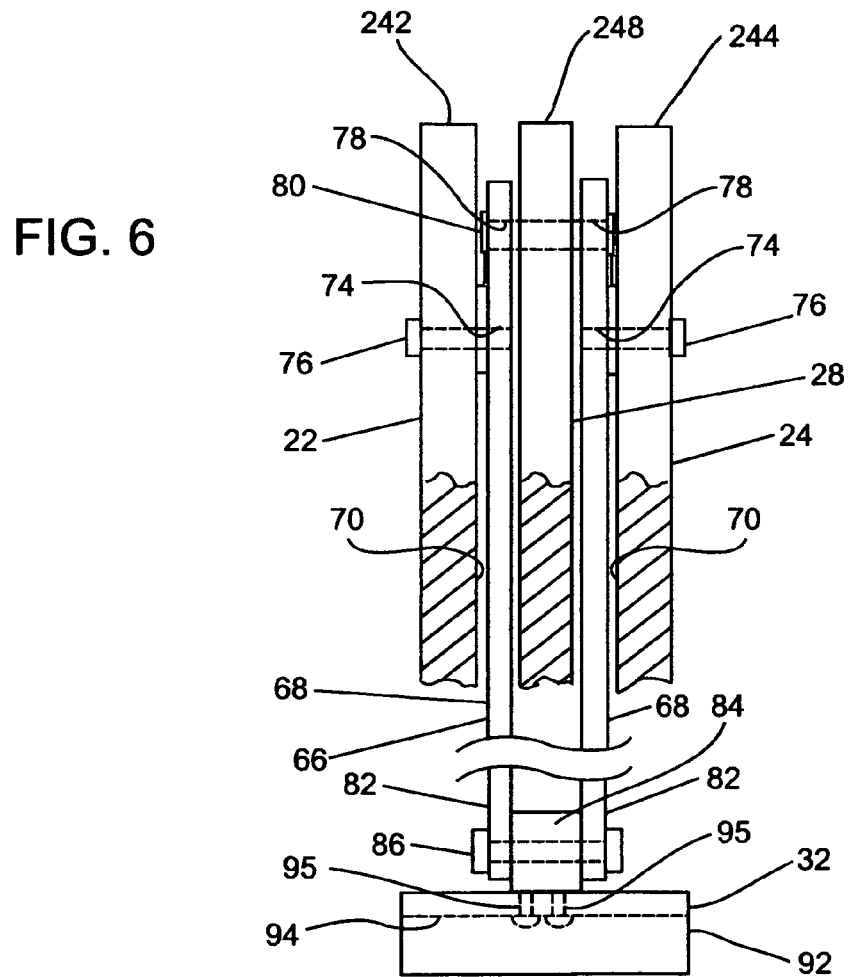
FIG. 6 is a transverse view, shown partially in section, of another fragment of the FIG. 1 transfer ring.

With reference again to FIGS. 3-5, the clamping assemblies 26 join the housing rings 22 and 24 together and maintain the spaced relationship therebetween and also provide the bearing surfaces along which the actuator ring 28 is permitted to rotate relative to the housing rings 22, 24. To this end, each clamping assembly 26 includes a body 40 of block-like shape having tab portions 42 protruding from one side (i.e. the lower side as viewed in FIGS. 3-5) which are intended to straddle both of the housing rings 22 and 24 when the body 40 is placed across and in abutting relationship with the radially outwardly-facing perimeter edges, indicated 242 and 244 of the rings 22 and 24, respectively.

Furthermore, each of the tab portions 42 includes a pair of through-bores 44 which are aligned with a corresponding pair of circular recesses 36 provided in the sidewalls of the housing rings 22 and 24, and the body 40 is securable in a fixed relationship with the housing rings 22 and 24 with set screws 46 whose shanks extend through the through-bores 44 of the tab portions 42 and are tightly threaded within the circular recesses 36 of the housing rings 22 and 24. It follows that the circular recesses 36 provided in the outer sidewalls of the housing rings 22 and 24 are positioned thereabout so that when the body 40 is positioned in abutting relationship with the outer perimeter edges 242, 244 of the housing rings 22 and 24, the through-bores 44 provided in the tab portions 42 can be aligned with the circular recesses 36 of the housing rings 22 and 24 for securement of the body 40 thereto.

Each body 40 of the clamping assemblies 26 further includes a housing ring-engagement surface 48 having spaced-apart areas, or flats 50, (best shown in FIG. 5) for stably engaging the outer perimeter edges 242, 244 of the housing rings 22, 24 when positioned thereagainst and also includes an internal cavity 52 (FIG. 4) within which a bearing 30 is rotatably mounted. The bearing 30 of each clamping assembly 26 has radially-extending flanges 54 at each of its two opposite ends and has a smooth cylindrical surface 56 extending between the two flanges 54. Furthermore, the bearing 30 has a central through-bore 58 through which a securement pin 60 extends for securement of the bearing 30 within the cavity 52 of the body 40. The pin 60 is, in turn, secured within the body 40 with a screw 60 whose shank is directed into the end of the pin 60 opposite the head end thereof. A bushing 64 can be positioned about the head end of the pin 60, and thrust washers 65 are disposed between the flanges 54 of the bearings and the adjacent surfaces of the body 40 to help maintain the bearing 30 in a centered relationship within the body 40. It follows that when the body 40 is secured across the perimeter edges 242, 244 of the housing rings 22, 24 in the aforedescribed manner, the cylindrical surface 56 of the bearing 30 rollably engages the radially outwardly-facing perimeter edge, indicated 248 in FIG. 4, of the actuator ring 28, and the opposite sidewalls of the actuator ring 28 are captured between the flanges 54 of the bearing 30. Therefore, when the several clamping assemblies 26 are positioned about the circumference of the housing rings 22 and 24 with the perimeter edge 248 of the actuator ring 28 collectively engaged by the surfaces 56 of the roller bearings 30 supported within the bodies 40 of the clamping assemblies 26, the actuator ring 28 is free to rotate relative to and within the housing rings 22, 24 between alternative angular positions.

The aforedescribed clamping assemblies 26 are advantageous in that they provide a means of securing the housing rings 22, 24 to one another at positions adjacent the outer perimeter edges 242, 244 of the rings 22, 24 which are not likely to interfere with the construction and operation of shoe-supporting linkage systems which join the shoes to the housing and actuator rings. By comparison, prior art attempts to secure the housing rings of a transfer ring together have involved the use of pins and linkage components which extend through the housing rings at locations adjacent the inner edges of the rings and whose location must therefore be taken into account when designing the shoe-supporting linkage systems for use therewith.

Moreover, each clamping assembly 26 of the depicted transfer ring 20 has the capability of being readily removed from one location along the perimeter edges 242, 244 of the housing rings 22, 24 and being re-attached, if desired, at an alternative location about the perimeter of the housing rings 22 and 24. Such an advantage can be readily appreciated when considering that in practice, transfer rings might be closely surrounded by equipment, such as conveyor trays, which could otherwise interfere with the movement of the transfer ring from one site (e.g. a first stage drum) to another site (e.g. a second stage drum). If such interference were to exist between such surrounding equipment and any of the clamping assemblies 26 of the transfer ring 20, the interfering clamping assemblies 26 could simply be removed from the remainder of the transfer ring 20 and re-attached, if desired, to alternative sites along the perimeter edge of the housing rings 22 and 24. Preferably, pairs of circular recesses 36 are provided at the housing ring location to which a clamping assembly 26 is desired to be re-attached to enhance the securement of the assembly 26 at the housing ring location to which the assembly 26 is re-attached.

The depicted transfer ring 20 is shown as possessing seven clamping assemblies 26 which are positioned at irregular intervals around the housing rings 22, 24, but a transfer ring 20 embodying the principles of the present invention could possess an alternative number of clamping assemblies 26 spaced therearound. Moreover, it is believed that the transfer ring 20 could be provided with a relatively sound structure with as few as three clamping assemblies 26 appropriately positioned about the housing rings 22, 24.

With reference to FIGS. 1, 2, 6 and 7, the actuator ring 28 is connected to the housing rings 22, 24 by way of a linkage system 29, introduced earlier, which accommodates a rotational movement of the actuator ring 28 relative to the housing rings 22 and 24. Moreover, the plurality of shoes 32 are mounted for radial movement with respect to the housing rings 22 and 24 by way of the linkage system 29 and which are adapted to engage the outer circumference of a belt and tread package positioned centrally of the circular spacing 23 defined between the shoes 32. The linkage system 29 of the depicted transfer ring 20 includes a plurality of linkage sets 66 wherein each set 66 includes a pair of arms 68 positioned within the gaps 70 (FIG. 6) defined between each of the opposite sidewalls of the actuator ring 28 and the adjacent sidewall of the housing rings 22 and 24.

Figure 7:
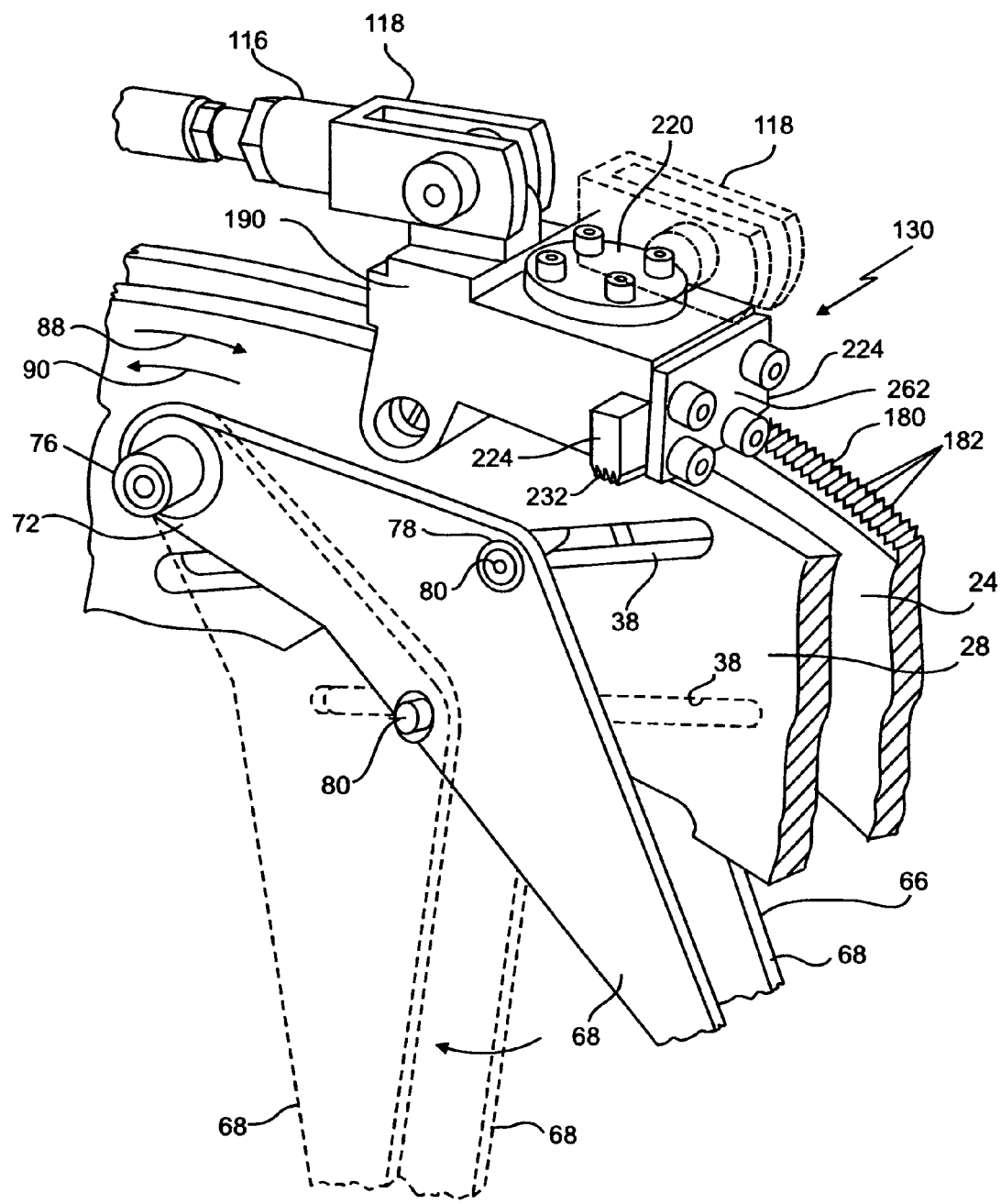
FIG. 7 is a perspective view of a portion of the FIG. 1 transfer ring, but shown with one of the housing rings removed from the remainder of the transfer ring.

At one end 72 (i.e. the radially outwardmost end) of each arm 68 is provided with a preformed opening 74 which is aligned with a corresponding bore 34 (FIG. 1) provided in the sidewall of a housing ring 22 or 24 through which a pivot pin 76 is secured to thereby enable the arm 68 to pivot relative to the housing rings 22, 24 between, for example, the FIG. 7 solid-line position of the arm 68 and the FIG. 7 phantom-line position of the arm 68. Another opening 78 is provided in each arm 68 intermediate its ends, and a single pin 80 extends, in sequence, through the opening 78 which has been provided in one arm 66, through one of the angularly-oriented slots 38 provided in the actuator ring 28, and then through the opening 78 provided in the other arm 68 of the set 66 so that both housing rings 22 and 24 are joined by the single pin 80 secured therein. Morever, the radially inwardmost end 82 (FIG. 6) of each arm 68 of each linkage set 66 is pivotally connected to a corresponding shoe 32 as by means of a spacer block 84 (which is secured to the body of the shoe 32) and a pin 86 which extends through the ends 82 of both arms 68 and the spacer block 84 and which permits the shoe 32 to pivot, or rotate, relative to the arm ends 82 about the pin 86.

It follows that as the actuator ring 28 is rotated relative to the housing rings 22, 24 in the direction indicated by the FIG. 7 arrow 88 in a manner which moves (i.e. advances) the actuator ring 28 in one rotational direction relative to the housing rings 22, 24, the linkage arms 68 are permitted to pivot about the pivot pins 76 relative to the housing rings 22, 24 so that the opposite ends 82 of the arms 68 move radially inwardly of the housing rings 22, 24 while the movement of the pin 80 is guided downwardly (as viewed in FIG. 7) along the slot 38. Such an rotation of, or advancement of movement of, the actuator ring 28 relative to the housing rings 22, 24 will be understood as collectively moving the shoes 32 radially inwardly of the housing rings 22, 24 for the purpose of, for example, moving the shoes 32 into a grasping relationship with the outer circumference of a belt and tread package disposed within the circular spacing 23 defined between the shoes 32.

It also follows that as the actuator ring 28 is rotated relative to the housing rings 22, 24 in the direction indicated by the FIG. 7 arrow 90 and in a manner which moves (i.e. reverses) the rotational movement of the actuator ring 28 relative to the housing rings 22, 24, the linkage arms 68 are permitted to pivot about the pivot pins 76 relative to the housing rings 22, 24 so that the opposite ends 82 of the arms 68 move radially outwardly of the housing rings 22, 24 while the movement of the pin 80 is guided upwardly (as viewed in FIG. 7) along the slot 38. Such a rotation of, or reversal of movement of, the actuator ring 28 relative to the housing rings 22, 24 will be understood as collectively moving the shoes 32 radially outwardly of the housing rings 22, 24 for the purpose of, for example, releasing the shoes 32 from a grasped relationship with the outer circumference of a belt and tread package disposed within the circular spacing 23 defined between the shoes 32.

With reference to FIGS. 2 and 16-18, each shoe 32 is connected to its adjacent shoes 32 by way of a two-bar linkage arrangement 96. In the depicted transfer ring 20, the linkage arrangement 96 includes a first bar 98 having one end 100 which is pivotally connected (by way of a screw and a spacer member 106) to a location adjacent one end of a shoe 32 and a second bar 102 having one end 104 which is pivotally connected (by way of a screw) to a location proximate one end of an adjacent shoe 32. Meanwhile, the ends of the two bars 98 and 102 opposite the bar ends 100 and 104 are pivotally joined to one another (with a pivot pin 105) so that as the shoes 32 are moved radially inwardly or outwardly relative to the circular spacing 23 defined therebetween (and the distance between the ends of the adjacent shoes 32 is altered as a result of such radial movement), the two-bar linkage arrangement 96 moves in a pincer-like fashion (i.e. with the bar ends 100 and 104 moving toward or away from one another) to accommodate the change in distance between the ends of the adjacent shoes 32. It follows that as the shoes 32 are moved radially inwardly and outwardly when a belt and tread package is disposed within the circular opening 23, the two bar linkage arrangement 96 moves in a pincer-like fashion about a pivot axis which extends substantially radially of the belt and tread package and so that the movement of the two bars 98 and 102 of the two bar linkage arrangement 96 relative to one another is substantially confined to a plane which is oriented tangential to the belt and tread package. By connecting all of the adjacent shoes 32 of the transfer ring 20 with such two-bar linkage arrangements 96 ensures that the package-engaging (inwardly-facing) surfaces 94 of the shoes 32 are continually directed inwardly of the circular spacing 23 as the shoes 32 are moved radially inwardly and outwardly of the spacing 23 and help reduce any likelihood that the shoes 32 could shift laterally with respect to the circular spacing 23 during a tire construction process so as to jeopardize the dimensional accuracies of the tire component under construction.

With reference to FIGS. 2 and 16-18, each shoe 32 is connected to its adjacent shoes 32 by way of a two-bar linkage arrangement 96. In the depicted transfer ring 20, the linkage arrangement 96 includes a first bar 98 having one end 100 which is pivotally connected (by way of a screw and a spacer member 106) to a location adjacent one end of a shoe 32 and a second bar 102 having one end 104 which is pivotally connected (by way of a screw) to a location proximate one end of an adjacent shoe 32. Meanwhile, the ends of the two bars 98 and 102 opposite the bar ends 100 and 104 are pivotally joined to one another (with a pivot pin 105) so that as the shoes 32 are moved radially inwardly or outwardly relative to the circular spacing 23 defined therebetween (and the distance between the ends of the adjacent shoes 32 is altered as a result of such radial movement), the two-bar linkage arrangement 96 moves in a pincer-like fashion (i.e. with the bar ends 100 and 104 moving toward or away from one another) to accommodate the change in distance between the ends of the adjacent shoes 32. By connecting all of the adjacent shoes 32 of the transfer ring 20 with such two-bar linkage arrangements 96 ensures that the package-engaging (inwardly-facing) surfaces 94 of the shoes 32 are continually directed inwardly of the circular spacing 23 as the shoes 32 are moved radially inwardly and outwardly of the spacing 23 and help reduce any likelihood that the shoes 32 could shift laterally with respect to the circular spacing 23 during a tire construction process so as to jeopardize the dimensional accuracies of the tire component under construction.

With reference to FIGS. 1, 2 and 8-10, the transfer ring 20 also includes means, generally indicated 110, for rotatably moving the actuator ring 28 relative to the housing rings 22, 24 about the central axis 254 of the transfer ring 20 and between alternative angular positions to thereby move the shoes 32 radially inwardly or outwardly of the circular spacing 23 collectively defined between the shoes 32. The moving means 110 of the depicted embodiment 20 includes an air-actuating, double-acting cylinder assembly 112 having a cylinder housing 114 which is secured to the housing rings 22 to accommodate pivotal movement relative thereto, 24 and a ram 116 having a bifurcated head 118 which is movable relative to and along the length of the cylinder housing 114 as air, under pressure, is delivered to one or the other ends (e.g. the rightward or leftward ends as viewed in FIGS. 1, 2 and 8-10) of the housing 114 from an air supply 119. The cylinder housing 114 defines an internal chamber 108 extending lengthwise therealong, and there is associated with the ram 116 a piston 120 which is slidably mounted within the chamber 108 of the cylinder housing 114 for movement relative to and along the length thereof (e.g. rightwardly or leftwardly as viewed in FIGS. 8-10) to urge the head 118 of the ram 116 (e.g. rightwardly or leftwardly as viewed in FIGS. 8-10) by way of a piston rod 122 to thereby move the shoes 32 radially inwardly or outwardly relative to the circular spacing 23 for purposes of grasping or releasing a belt and tread package disposed within the spacing 23.

Figure 11A:
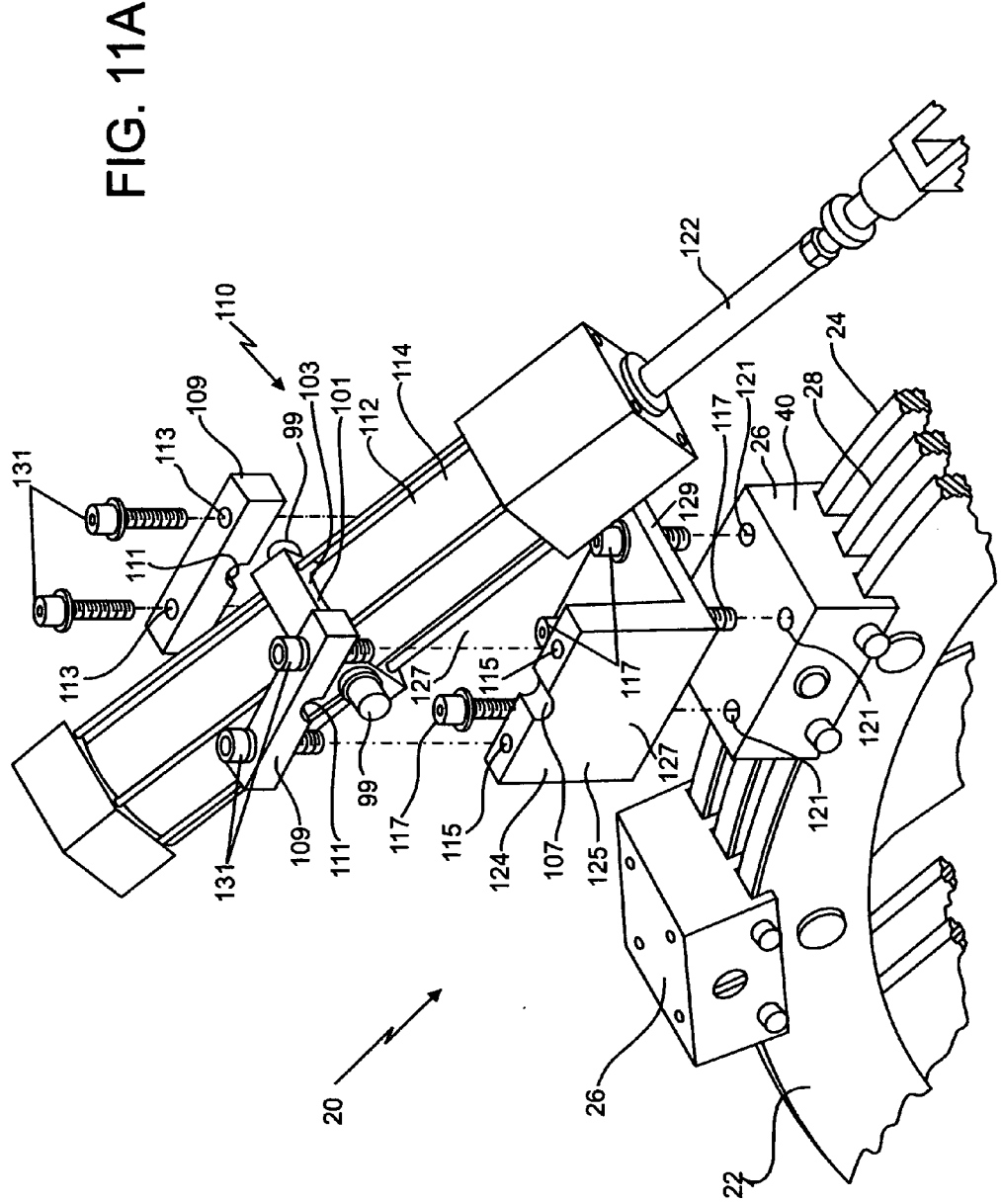
FIG. 11a is a perspective view of another portion of the FIG. 1 transfer ring, shown exploded.

With reference to FIGS. 1 and 11a, the cylinder housing 114 is secured to the housing rings 22 and 24 by way of a lug-providing bracket 101 secured about the cylinder housing 114 and a bracket assembly 124 which is secured about the lug-providing bracket 101 to permit pivotal movement of the housing 114 relative to the bracket assembly 124. The bracket assembly 124 is, in turn, rigidly connected atop one of the clamping assemblies 26 for securement of the cylinder housing 114 to the housing rings 22, 24. As best shown in FIG. 11a, the lug-providing bracket 101 includes a ring-shaped portion 103 which is tightly secured about the housing 114 and includes a pair of cylindrical lugs 99 which extend away from the opposite sides of the housing 114. The bracket assembly 101 includes a member 125 which is U-shaped in cross-section having a pair of side portions 127 which extend upwardly from a base portion 129. Each of the upper edges of the side portions 127 include an upwardly-opening notch 107 for accepting a corresponding lug 99 of the bracket 101, and a clamp bar 109 having a downwardly-opening notch 111 is positioned atop the upper edges of the side portions 127 so that its downwardly-opening notch 111 overlies the lug 99 positioned within the notch 107. The clamp bars 99 are thereafter secured atop the side portions 127 with screws 131 whose shanks extend through openings 113 provided in the clamp bars 109 and which are tightenable within internally-threaded openings 115 provided in the upper edges of the side portions 127. With the lugs 99 secured within the bracket assembly 124 in the aforedescribed manner, the cylinder housing 114 is permitted to pivot relative to the bracket assembly 124 about the lugs 99.

With reference still to FIG. 11a, the bracket assembly 124 is securable atop the body 40 of a clamping assembly 26 with bolts 117 which are directed through openings provided in the base portion 129 of the bracket assembly 101 and tightenable within internally-threaded openings 121 provided in the upper surface (as viewed in FIG. 11a) of the body 40 of the bracket assembly 124. It follows that with the bracket assembly 124 fixed to the housing rings 22, 24 by way of the body 40 of the clamping assembly 26 as aforedescribed and with the cylinder housing 114 pivotally connected to the bracket assembly 124 by way of the lugs 99, the cylinder housing 114 is permitted to pivot about the lugs 99 relative to the housing rings 22, 24. Such a permitted pivotal movement of the cylinder housing 114 relative to the housing rings 22, 24 permits the cylinder housing 114 to remain in-line, or in a linear relationship, with the components (described herein) of the transfer ring 20 to which the ram head 118 is secured.

The ram head 118 is pivotally connected to the actuator ring 28 by way of an intermediate assembly 130 (described herein) so that by moving the ram head 118 leftwardly or rightwardly (as viewed in FIGS. 1, 2 and 7-10) relative to the cylinder housing 114 effects a rotational movement of (i.e. the advancement of) the actuator ring 28 relative to the housing rings 22 and 24 and a corresponding movement of the shoes 32 radially inwardly or outwardly relative to the circular spacing 23 defined by the shoes 32.

It is a feature of the transfer ring 20 that it includes means, generally indicated 132, for anchoring the ram head 118 in a fixed position relative to the cylinder housing 114 upon the occurrence of a predetermined event, such as upon the displacement of the ram head 118 relative to the cylinder housing 114 by a desired amount. As will be explained herein, such a desired displacement of the ram head 118 will have been reached upon rotational movement of, or advancement of, the actuator ring 28 relative to the housing rings 22 so that the outer circumference of a belt and tread package which is disposed within the circular spacing 23 is tightly grasped by the shoes 32 and exposed to a desired amount of pre-load (i.e. radially inwardly-directed forces) applied to the outer circumference thereof by the shoes 32.

In preparation of the transfer ring 20 for use, a belt and tread package which possesses a desired diameter (i.e. an outer diameter as measured through the center of the belt and tread package and which is desired to be maintained throughout a carcass-inflation process) is placed into the central spacing 23 of the transfer ring 20 and the shoes 23 are moved radially inwardly of the circular spacing 23 toward and into engagement with the belt and tread package by way of the cylinder assembly 112. As will be apparent herein, actuation of the cylinder assembly 112 is halted when the shoes 23 are engaged in a tight-fitting relationship about the outer circumference of the belt and tread package and apply a radial inwardly-directed (i.e. pre-load) force to the package in a manner described herein. Upon achievement of such a condition, the position of the ram head 118 relative to the cylinder housing 114 is anchored, or fixed, so that the actuator ring 28 cannot be rotatably moved rearwardly relative to the housing rings 22, 24 by cylinder assembly 112. Therefore and as will be apparent herein, forces generated during the use of the transfer ring 20 and which urge the actuator ring 28 to rotate rearwardly relative to the housing rings 22, 24 (i.e. a direction which would move the shoes 32 radially outwardly of the circular spacing 23) are limited by the anchored condition of the ram head 118 relative to the cylinder housing 114.

Figure 10:
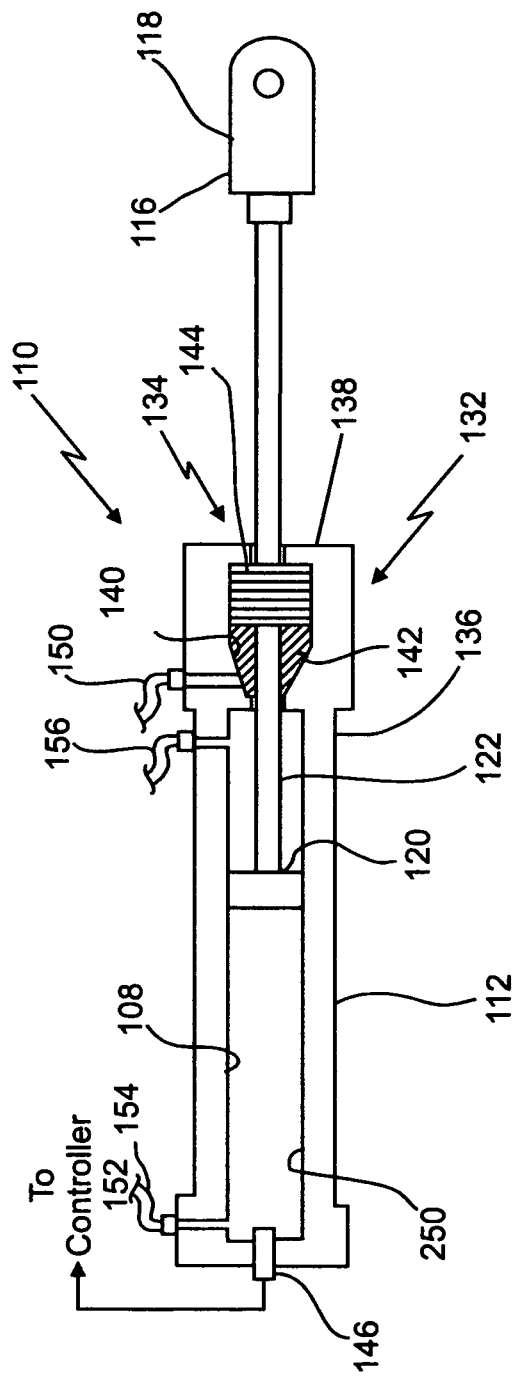

In the depicted embodiment 20, the anchoring means 132 for fixing the ram head 118 in position relative to the cylinder housing 114 includes a locking assembly, generally indicated 134 in FIGS. 8-10, mounted at the end, indicated 136, of the cylinder housing 114 for locking the piston rod 122 in a fixed longitudinal position relative to the cylinder housing 114 upon the occurrence of a predetermined event which in this case can be the achievement of the aforedescribed condition at which the outer circumference of a belt and tread package disposed within the circular spacing 23 is tightly grasped by the shoes 32 and exposed to a desired amount of pre-load (i.e. radially inwardly-directed forces) applied to the outer circumference thereof by the shoes 32.

Although the locking means 134 can take any of a number of forms, the locking means 134 of the depicted transfer ring 20 employs a body 138 disposed at the end 136 of the cylinder housing 114 which defines an internal cavity 140 (best shown in FIGS. 8-10) through which the piston rod 122 extends and a collet 142 which is positioned within the internal cavity 140 for movement lengthways therealong and encircles the piston rod 122. When the collet 142 is disposed at one end of the cavity 140 (i.e. the rightward end of the cavity 140 as viewed in FIGS. 8-10), the piston rod 122 is free to move lengthwise through the internal cavity 140 and the cylinder housing 114. However, when the collet 142 is disposed at the opposite end of the cavity 140 (i.e. the leftward end of the cavity 140 as viewed in FIGS. 8-10), the collet 142 is grasped about the piston rod 122 and cooperates with the surfaces of the internal cavity 140 to thereby prevent movement of the piston rod 122 relative to and along the length of the cylinder housing 114 and thereby lock the positional relationship of the ram head 118 and the cylinder housing 112.

The movement of the collet 142 between the rightward and leftward ends of the internal cavity 140 is effected by a compression spring 144 which is disposed between the collet 142 and the righwardmost end of the cavity 140 and which continually biases the collet 142 toward the leftwardmost end of the cavity 140 and the creation of air pressure within the cavity 140 on the left side of the collet 142 sufficient to overcome the biasing strength of the spring 144. In other words, as long as no air pressure exists within the cavity 140 on the leftwardmost side of the collet 142, the spring 144 maintains the collet 142 in its leftwardmost position within the cavity 140 and in a locked relationship about the piston rod 122, and upon the creation of air pressure within the cavity 140 sufficient to overcome the biasing strength of the compression spring 144, the collet 142 moves out of locked relationship with the piston rod 122 and toward its rightwardmost position within the cavity 140.

The initiation of the anchoring, or locking, action of the collet 142 about the piston rod 122 can be accomplished in any of a number of ways, but in the depicted transfer ring 20, there is provided a pressure sensor 146 which is in flow communication with the leftward end, indicated 250 in FIGS. 8-10, of the internal chamber 108 of the cylinder housing 114 for sensing the internal pressure of air supplied therein to move the ram head 118 rightwardly along the length of the cylinder housing 114, and a relief valve 148 (FIG. 1) is connected to an air supply line, indicated 150, leading to the collet-containing cavity 140 so that upon sensing of a predetermined pressure reached within the leftward end 250 of the internal chamber 108 corresponding to a target air pressure necessary for the shoes 32 to apply the aforedescribed grasping and pre-load forces, or pressure, to the outer circumference of a belt and tread package disposed within the circular spacing 23 of the transfer ring 20, the air supply to the collet-containing cavity 140 is shut off and the relief valve 148 is opened to release the air pressure contained within the cavity 140 and so that the collet 142 is returned (by the compression spring 144) into locked relationship with the piston rod 122.

Control of air flow from the air source 119 to the internal chamber 108 of the cylinder housing 114 and the collet-containing cavity 140 can be had through a controller 152 (FIG. 1) which permits an operator to control the flow of air from the air supply 119 and into the collet-containing cavity 140 by way of the air supply line 150 and into the leftward end 250 of the housing chamber 108 through an air conduit 154 to thereby move the ram head 118 rightwardly (as viewed in FIG. 8-10) with respect to the cylinder housing 112. Such a controller 152 can also be used to direct air into the rightward end of the housing chamber 108 through an air conduit 156 to thereby move the ram head 118 leftwardly (as viewed in FIGS. 8-10) with respect to the cylinder housing 112.

Also associated with the air conduits 154 and 156 are flow valves 158 or 160 (FIG. 1) to which the controller 152 is connected for opening or closing, as desired, the flow of air to the leftward or rightward end of the cylinder chamber 108. Each valve 158 or 160 further possesses the capability of relieving the internal pressure within its corresponding end of the chamber 108 if air is being supplied to the opposite end of the chamber 108. It will also be understood that when it is desired to move the piston head 118 relative to and along the length of the cylinder housing 114 in either of its rightward or leftward directions, sufficient air pressure must be present within the collet-containing cavity 140 to maintain the collet 142 out of a locked relationship with the piston rod 122.

The target air pressure sensed by the sensor 146 at which the air supply to the collet-containing cavity 140 is shut off and the internal pressure released therefrom (to thereby fixedly secure the ram head 118 in fixed relationship along the length of the cylinder housing 114) can be set at the controller 152 by an operator. In practice and as will be apparent herein, such a target air pressure will correspond to the air pressure contained within the leftward end 250 of the cylinder housing chamber 108 necessary to move the shoes 32 radially inwardly into engagement with the outer circumference of a belt and tread package positioned within the circular spacing 23 and to apply to the belt and tread package a predetermined amount of radially inwardly-directed forces. Once established for a belt and tread package of a desired size (i.e. diameter), the target air pressure need not be re-set at the controller 152 for use of the transfer ring 20 with another belt and tread package of the same size.

In accordance with the foregoing, it will be understood that the cylinder assembly 112 undergoes a sequence of operations before its piston rod 122 is anchored in position relative to the cylinder housing 114. For example, at the outset of an operation utilizing the transfer ring 22, the shoes 32 are in a radially outwardmost position, as illustrated in FIG. 2, for acceptance of a belt and tread package positioned within the circular spacing 23 defined within the transfer ring 20 and the ram head 118 of the cylinder assembly 112 is in a retracted condition within the cylinder housing 114 as illustrated in the exemplary position shown in FIG. 8. Once a belt and tread package is positioned within the circular spacing 23, air is directed through the supply line 150 into the collet-containing cavity 140 so that the collet 142 is moved out of locked relationship with the piston rod 122 (and to the position indicated in FIG. 8) and air is delivered to the leftward end 250 of the internal chamber 108 through the air conduit 154 so that the piston 120 and ram head 118 are moved rightwardly (as viewed in FIG. 8) to thereby rotate the actuator ring 22 in a forward rotational direction relative to the housing rings 22, 24 for moving the shoes 32 radially inwardly with respect to the circular spacing 23 defined between the shoes 32.

By continuing to deliver air into the leftward end 250 of the housing chamber 108 by way of the conduit 154, the ram head 118 continues to be displaced from the cylinder housing 114 toward, for example, the position depicted in FIG. 9, until the shoes 32 tightly engage the outer circumference of the belt and tread package and apply thereto a desired pre-loading force (as will be described herein). At that point, the internal pressure contained within the internal chamber 108 of the cylinder housing 114 (and sensed by the sensor 146) will equal the target pressure set at the controller 152 so that the air flow to both the internal chamber 108 and the collet-containing cavity 140 is shut off by the controller 252, and the internal pressure within the collet-containing cavity 140 is thereafter relieved through the valve 148 so that the collet 142 is permitted to move rightwardly through the cavity 140 (to the position illustrated in FIG. 10) and into locked engagement with the piston rod 122 so that the ram head 118 is thereby fixed, or anchored, in a stationary relationship along the length of the cylinder housing 114.

With reference to FIGS. 11-14, it is a feature of the transfer ring 20 that it also includes an intermediate assembly 130, introduced above, interposed between the ram head 118 and the actuator ring 28 which accommodates a degree of contraction in size (i.e. diameter) of the belt and tread package following the anchoring of the ram head 118 in fixed position along the length of the cylinder housing 114 while maintaining a substantially uniform pressure of the shoes 32 against the outer circumference of the belt and tread package during such a contraction.

There is associated with the intermediate assembly 130 (for a reason which will be apparent herein) a brake rack arrangement, generally indicated 164, which includes a pair of elongated, arcuate-shaped brake racks 166 which are fixedly secured to the outwardly-directed perimeter edges 242, 244 of the housing rings 22, 24. As exemplified in the FIG. 12 view, each brake rack 166 includes an elongated body 168 having two opposite end portions 170 and 172, and each end portion 170 and 172 has an opening 174 through which the body 168 is secured against the perimeter edge 242 or 244 of a corresponding housing ring 22 and 24 with screws 176 whose shanks extend through the openings 174 and are tightened within internally-threaded openings 178 provided in the perimeter edges 242 or 244 of the housing rings 22, 24.

Figure 15:
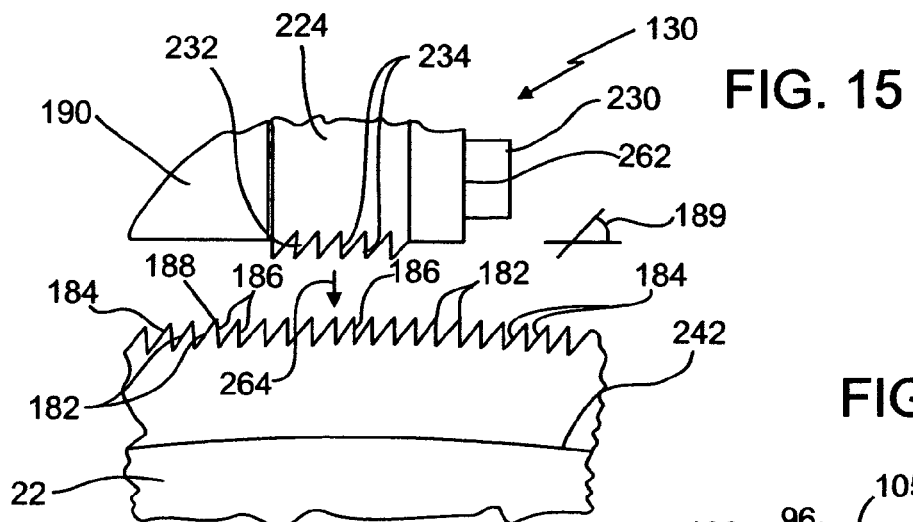
FIG. 15 is a side elevational view of a fragment of the FIG. 13 view but drawn to a slightly larger scale and showing the teeth-engaging surfaces of a brake rack and the intermediate assembly in a disengaged relationship.
Figure 17:
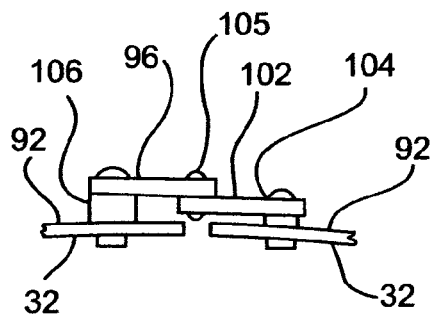
FIG. 17 is a side elevation view of the fragments of FIG. 16, as seen generally from below in FIG. 16.
Figure 16:
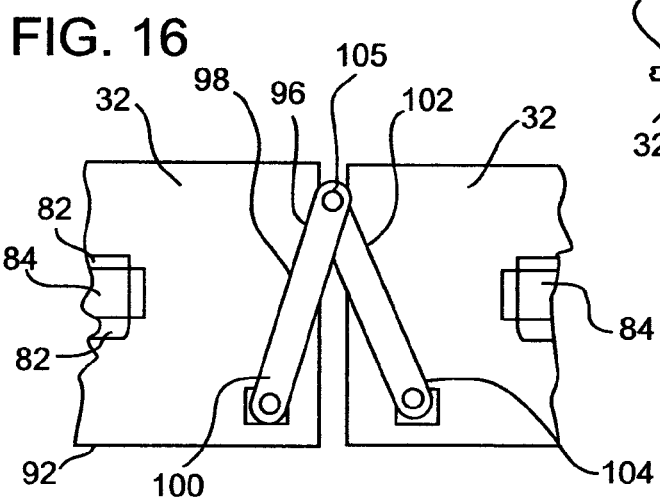
FIG. 16 is a plan view of fragments of adjacent shoes of the FIG. 1 transfer ring when the shoes are disposed close to one another and in the collapsed condition of FIG. 1.
Figure 18:
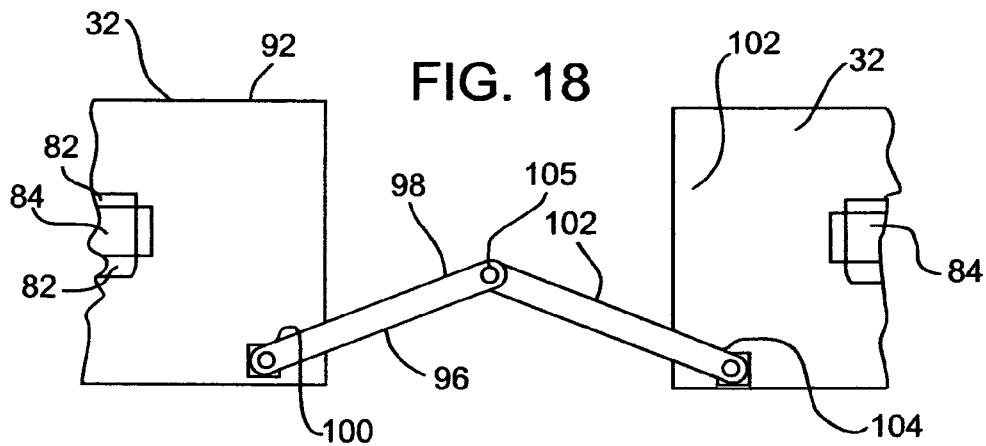
FIG. 18 is a plan view similar to that of FIG. 16, but showing the shoe fragments when the shoes are disposed further apart and in the retracted condition of FIG. 2.

Extending between the end portions 170 and 172 of each brake rack body 168 is a radially outwardly-directed surface 180 which defines a series of teeth 182 therealong and whose edges extend laterally across the perimeter edge 242 or 244 of the housing ring 22 or 24 to which it is joined. Furthermore and as best shown in FIG. 15, each teeth 182 has a rearward face 184 which is sloped at an acute angle 189 with respect to the longitudinal axis of the rack body 168 and a forward face 186 which is oriented substantially normal to the longitudinal axis of the body 168 from the apex 188 of the tooth 182. As will be apparent herein, the respective orientations of the forward and rearward faces 184 and 186 of the teeth 182 cooperate with the intermediate assembly 130 for permitting one directional movement of the brake rack bodies 168 relative to the intermediate assembly 130 when positioned in meshed relationship therewith.

With reference again to FIGS. 11-14, the intermediate assembly 130 includes an elongated body 190 having two opposite ends 192 and 194 and is pivotally connected to both the ram head 118 and the actuator ring 28 at spaced-apart axes, described herein. In this connection, the elongated body 190 is somewhat block-like in shape and includes at its end 192 a downwardly-extending (as viewed in FIGS. 12-14) pair of spaced-apart tabs 196 (only one shown in FIGS. 12-14) which are intended to straddle the perimeter edge 248 of the actuator ring 28 and also includes an upwardly-extending boss 198 sized to be accepted between the bifurcations, or forks, of the ram head 118 when positioned therebetween. Each of the bifrications of the ram head 118 is provided with a through-opening 210 (FIG. 12), and the boss 198 is provided with a transversely-extending opening 208. By positioning the bifurcations of the ram head 118 about the boss 198 so that the through-openings 210 align with the boss opening 208, the shank of a pivot pin 212 can be directed through the aligned openings 208, 210 and secured therein (with a nut 268) to pivotally connect the block-like body 190 to the ram head 118 for pivotal movement of the body 190 relative to the ram head 118 about an axis 252 (i.e. a first axis of pivot) which is substantially parallel to the central axis 254 of the transfer ring 20.

Each of the tabs 196 of the block-like body 190 is provided with a through-opening 200 (FIG. 12) with which the body 190 is secured to the actuator ring 28 with threaded bolts 202 directed through the tab openings 200 and tightened within pre-formed threaded openings 204 (FIG. 12) provided within the sidewalls of the actuator ring 28. A bushing 206 can be interposed between the outer surface of each bolt 202 and the inner surfaces of the corresponding tab opening 200 to facilitate the permitted pivotal movement of the body 190 relative to the actuator ring 28 about a pivot axis 256 (FIGS. 13 and 14), i.e. a second axis of pivot, which is substantially parallel to the central axis 254 of the transfer ring 20.

It follows that with the bolts 202 pivotally connecting the tabs 196 to the actuator ring 28, the end 194 of the block-like body 190 is permitted to pivot relative to the actuator ring 28 (e.g. either upwardly or downwardly as viewed in FIGS. 13 and 14) about the pivot axis 256, and with the pivot pin 212 pivotally connecting the boss 198 to the ram head 118, the end 194 of the block-like body 190 is permitted to pivot relative to the actuator ring 28 (e.g. either upwardly or downwardly as viewed in FIGS. 13 and 14) about the pivot axis 252.

Figure 13:
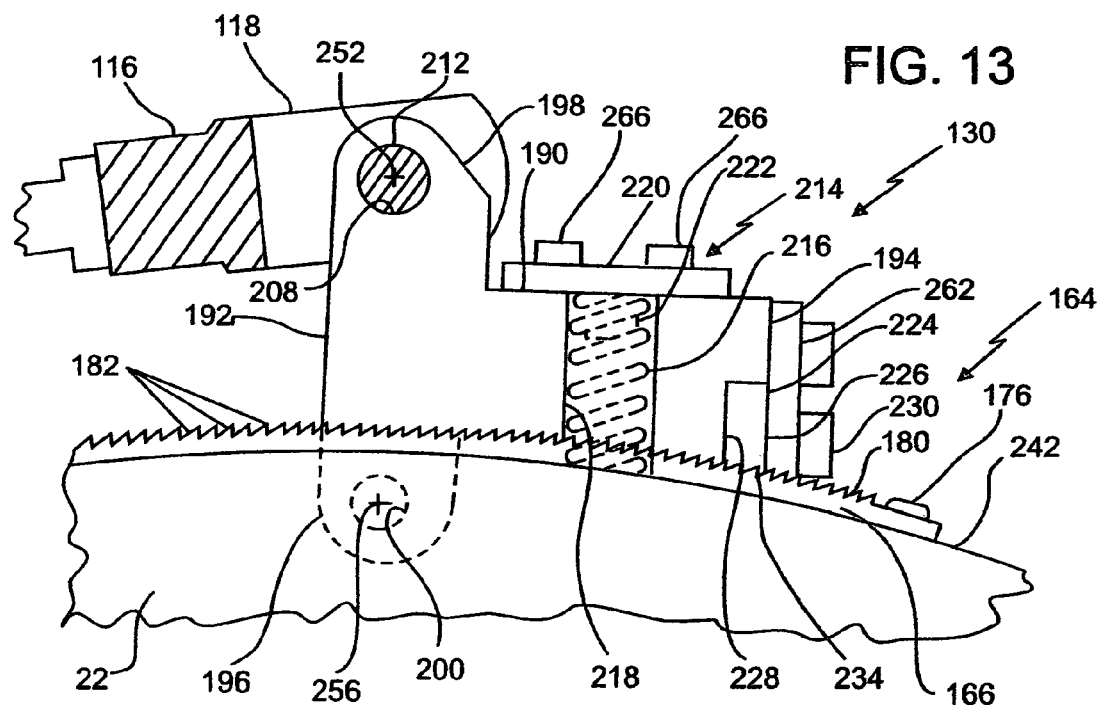
FIG. 13 is a side elevational view of the assembled portion of the transfer ring, as seen generally from the left in FIG. 12 showing components of the intermediate assembly in one position relative to the housing rings.
Figure 14:
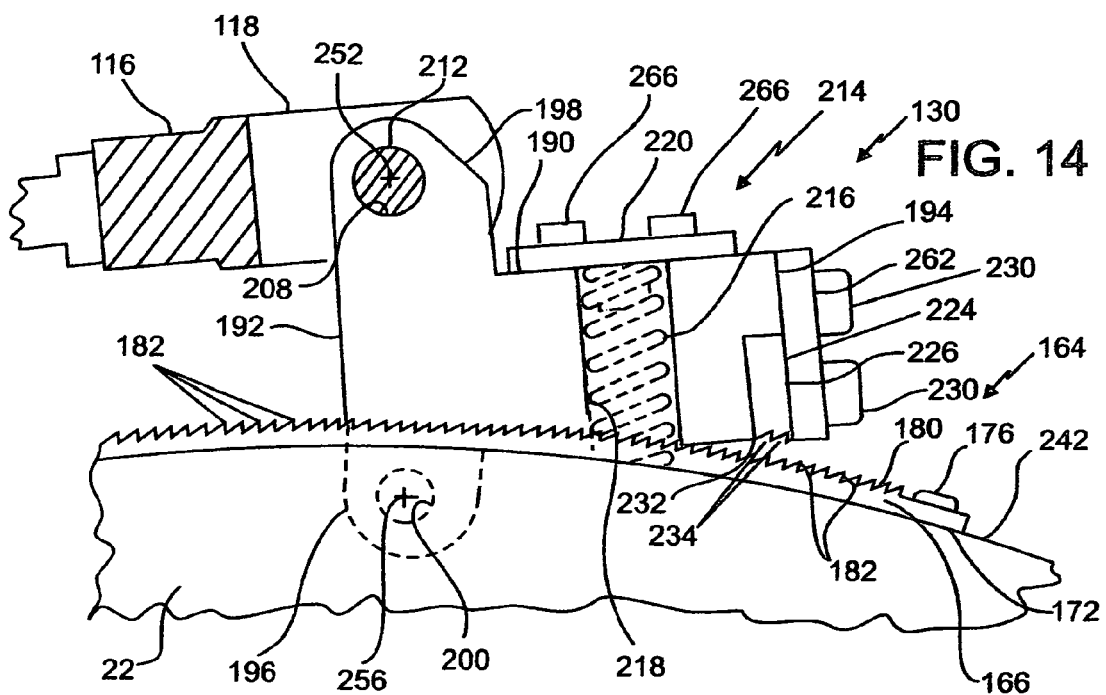
FIG. 14 is a view similar to that of FIG. 13, but showing components of the intermediate assembly in another position relative to the housing rings.

The intermediate assembly also includes means, generally indicated 214, for continually biasing the end 194 of the block-like body 190 away from the actuator ring 28 about the pivot axis 256 (e.g. between the position depicted in FIG. 13 toward the position depicted in FIG. 14). In the depicted embodiment 20, such biasing means 214 is in the form of a compression spring 216 which is mounted within the block-like body 190 for acting between the block-like body 190 and the perimeter edge 248 of the actuator ring 28. In this connection, the block-like body 190 includes a through-bore 218 within which the spring 216 is positioned, and a cap 220 is fixedly secured to the top surface (as viewed in FIGS. 13 and 14) which closes off the through-bore 218 at the upper end thereof. The cap 220 can also be provided with a downwardly-extending plug portion 222 about which the upper end of the spring 216 is snuggly encircled so that the spring 216 is held within the through-bore 218 by the cap 220. With the spring 216 held within the through-bore 218 in such a manner, one end (i.e. the lower end as viewed in FIGS. 13 and 14) of the spring 216 is free to move into or out of engagement with the perimeter edge 248 of the actuator ring 28 as the block-like body 190 is pivoted about the pivot axis 256 and the other end (i.e. the upper end as viewed in FIGS. 13 and 14) of the spring 216 abuttingly engages the underside of the cap 220 to continually urge the end 194 of the block-like body 190 upwardly (as viewed in FIGS. 13 and 14) and away from the perimeter edge 248 of the actuator ring 22 as long as the lower end of the spring 216 is urged against the perimeter edge 248 of the actuator ring 28.

Figure 12:
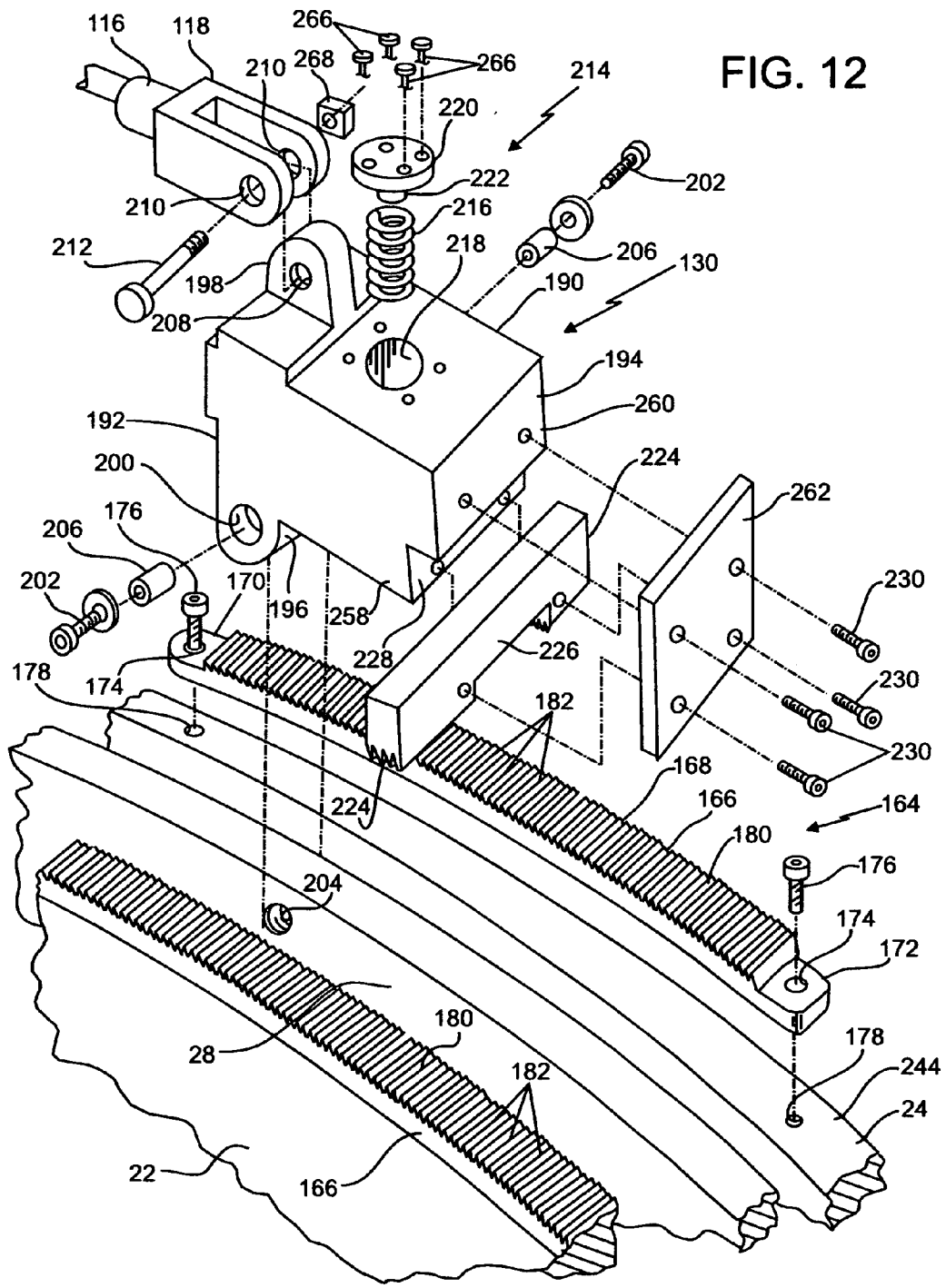
FIG. 12 is a exploded perspective view of a fragment of the transfer ring illustrated in FIG. 7 shown before a housing ring is removed from the remainder of the transfer ring.

The intermediate assembly 130 also includes a pair of lug portions 224 which extend laterally from each of the opposite sidewalls, indicated 258, 260 in FIG. 12, of the block-like body 190 for cooperating with the brake racks 166 in a manner described herein. In the depicted embodiment 20, the lug portions 224 are provided by the end portions of an elongaged plate 226 which is positioned within a notch 228 provided at the end 194 of the block-like body 190 and which is secured across the end 194 of the body 190 with a plate 262 and four screws 230 so that only the end portions of the plate 226 extend outwardly from the sidewalls 258, 260 of the block-like body 190.

Moreover, these lug portions 224 are disposed in such a relation to the brake racks 166 secured to the housing rings 22, 24 so that when the end 194 of the block-like body 190 is fully pivoted downwardly (as viewed in FIGS. 13 and 14) about the pivot axis 256 to the position shown in FIG. 13, each lug portion 224 engages a teeth-defining surface 180 of the brake racks 166. Furthermore and as best shown in FIG. 15, each lug portion 224 defines a rack-engaging surface 232 which is provided with a series of teeth 234 which, when moved downwardly upon a brake rack 160, in the direction of the arrow 264, are adapted to matingly engage the teeth 182 of the brake rack 166. The teeth 234 of the lug portions 224 also possess rearward and forward faces which are sloped complimentary to those of the teeth 182 of the brake racks 166 so that when the teeth 234 and 182 are in meshed relationship with one another and if longitudinally-directed forces were to be applied to the body 190, movement of the intermediate assembly 130 relative to the brake rack surfaces 180 will only be permitted in one longitudinal direction along the brake racks 166.

More specifically and with the teeth 234 and 182 in meshed relationship with one another, the shape of the teeth 234 and 182 prevent a longitudinal shift of the block-like body 190 relative to the underlying rack surfaces 180 in a leftward direction, as viewed in FIG. 13. On the other hand, however, such a shaping of the teeth 234 and 182 will less-aggressively prevent a forced movement of the block-like body 190 in a rightward direction, as viewed in FIG. 13, relative to the underlying brake rack surfaces 180 so that if the body 190 is urged rightwardly with enough force to overcome the gripping engagement of the teeth 234, 182, the body 190 will move rightwardly along the brake rack surfaces 180. Such permitted one-directional movement of these components will, in practice, permit the actuator ring 28 to rotatably move in one (i.e. a forward) direction relative to the housing rings 22, 24 which, in turn, effects the collective movement of the shoes 32 further radially inwardly of the circular spacing 23 while preventing the actuator ring 28 from being rotatably moved in the opposite (i.e. a rearward) direction relative to the housing rings 22, 24. Consequently and as long as the lug portions 224 of the intermediate assembly 130 are in meshed relationship with the teeth-defining surfaces 180 of the brake racks 166, the actuator ring 28 is prevented from being rotated rearwardly with respect to the housing rings 22, 24.

It therefore follows from the foregoing that the block-like body 190 is pivotally movable relative to the brake rack surfaces 180 (and about the pivot axis 256) between a scotched condition (illustrated in FIG. 13) at which the body 190 is in engagement with the brake rack surfaces 180 for preventing the movement of the shoes 32 radially outwardly of the radial position assumed by the shoes 32 when initially anchored against the belt and tread surface by way of the anchoring means 132 yet permitting the movement of the shoes 32 radially inwardly of the radial position and a condition of release (such as is depicted in FIG. 14) at which the body 190 is out of engagement with the brake surfaces 180 so that the shoes 32 are permitted to move radially inwardly or outwardly relative to the circular spacing 23.

The aforedescribed intermediate assembly 130 is advantageous in that from the moment that the shoes 32 are moved inwardly of the circular spacing 32 into engagement with the outer circumference of the outer circumference of the belt and tread package until the moment that the belt and tread package (within which a tire carcass has been inflated) is released, the spring 216 acts between the block-like body 190 and the perimeter edge 248 of the actuator ring 28 to urge the end 194 of the block-like body 190 to pivot about the pivot axis 256 and away from the perimeter edge 248 of the actuator ring 28. Such a feature ensures even after the shoes 32 have been locked (by way of the anchoring means 132) to fix the positional relationship between the ram head 118 and the cylinder housing 114, there will continue to exist a biasing force applied to the shoes 32 by way of the compression spring 216 of the intermediate assembly 130 which continually urges the shoes 32 to further move further inwardly of the position assumed by the shoes 32 when the ram head 118 was fixed in position with respect to the cylinder housing 114 by way of the anchoring means 132. Thus, the aforementioned pre-load force which is applied through the shoes 32 and against the outer circumference of the belt and tread package disposed within the spacing 23 includes the force of the spring 216 which acts between the ram head 118 and the perimeter edge 248 of the actuator ring 28.

Such a radially inwardly-directed biasing of shoes 32 is advantageous in that it permits the shoes 32 to move further radially inwardly of the position assumed by the shoes 32 when the ram head 118 is initially anchored (by way of the anchoring means 132) with respect to the cylinder housing 114 to thereby compensate, if necessary, for any contraction in size (e.g. diameter) of the belt and tread package grasped by the transfer ring 20 and before a tire carcass is inflated within the interior surfaces of the belt and tread package while ensuring that the shoes 32 continue to maintain a substantial uniform grasping force around the belt and tread package. In other words, even if the belt and tread package were to contract in size (as could happen during transfer of the belt and tread package from a first stage drum to a second stage drum), the inwardly-directed movement of the shoes 32 induced by the compression spring 216 maintains a desirable grasp of the belt and tread package by the shoes 32 so that little or no deleterious deformation of the belt and tread package will result from such a contraction.

Upon subsequent inflation of a tire carcass within the interior of the belt and tread package grasped by the tire, the block-like body 190 cooperates with the brake racks 166 to lock the actuator ring 28 relative to the housing rings 22, 24 so as to prevent a rearward rotation of the actuator ring 28 relative to the housing rings 22, 24. In other words, any back-driving forces which may be generated during a carcass-inflation process would limit the rearward movement of the actuator ring 28 relative to the housing rings 22, 24 to the position assumed by the actuator ring 28 when the ram head 118 was previously anchored in position with respect to the cylinder housing 114 because that is where the teeth 234 and 182 of the lug portions 224 and the brake racks 166 are in meshed relationship with one another.

It follows from the foregoing that even after the shoes 32 are initially urged into its tight-fitting relationship with the outer circumference of a belt and tread package and the ram head 118 is anchored in position in relation to the cylinder housing 114 and the lug portions 224 of the block-like body 190 are in interlocking relationship with the brake racks 166 so as to prevent a back-driving of the actuator ring 28 relative to the housing rings 22, 24, the actuator ring 28 is continually urged to rotate forwardly relative to the housing rings 22 and 24 by the compression spring 216. Therefore and in the event that the belt and tread package were to contract in size, or more specifically, its diameter were to decrease, following the initial positioning of the shoes 32 about the package, the shoes 32 are moved radially inwardly of the transfer ring 20 by the spring 216 against the outer circumference of the belt and tread package. In such an instance, the spring 216 helps to maintain a substantially uniform pressure upon the outer circumference of the belt and tread package through the shoes 32 during any contraction of the package. It also follows that as the shoes 32 are moved radially inwardly about the belt and tread package to compensate for a contraction of the size of the belt and tread package, the rightward end of the block-like body 190 pivots about the pivot axis 256 and away from the brake racks 166 (thereby permitting the length of the spring 216 to increase in conjunction with the rotational advancement of the actuator ring 28 relative to the housing rings 22, 24).

The use of the transfer ring 20 will now be described for transferring a belt and tread package (having a desired diameter) from a first stage drum (i.e. about which the package is constructed) to a second stage drum about which a tire carcass is positioned and for holding the belt and tread package about the tire carcass while the carcass is inflated against the interior of the package. In this connection, the transfer ring 20 (with its shoes disposed in the FIG. 2 retracted position) is directed over a belt and tread package so that the circular spacing 23 collectively defined between the retracted shoes 32 is substantially centered about the belt and tread package. At that point, air is directed into the collet-containing cavity 140 and the leftward end 250 of the internal chamber 108 of the cylinder housing 114 so that the collet 142 is moved out of locking relationship with the piston rod 122 and the ram head 118 is moved relative to the cylinder housing 114 so that the shoes 32 are moved toward and into engagement with the outer circumference of the belt and tread package.

By way of the cylinder assembly 112, the shoes 32 continue to apply inwardly-directed pressure upon the cylinder assembly 112 until the shoes 32 reach a desired radial position about the belt and tread package wherein the desired radial position corresponds to the radial position assumed by the shoes 32 when they apply a radially inwardly-directed biasing force of predetermined strength to the belt and tread package. Such a force of predetermined strength includes the amount of cylinder-applied force necessary to both rotate the actuator ring 28 forwardly relative to the housing rings 22, 24 so as to move the shoes 32 into engagement with the belt and tread package and to pivot the block-like body 190 about the pivot axes 252 and 256 so that the body 190 is in scotched relationship with the brake racks 16. Upon movement of the shoes 32 radially inwardly to the aforedescribed radial position—which condition is achieved when the air pressure sensed within the leftward end 250 of the chamber 108 reaches a predetermined target pressure, the controller 252 shuts off the flow of air to the leftward end 250 of the cylinder housing 114 and to the collet-containing cavity 140 and relieves the pressure within the cavity 140 so that the collet 142 fixedly secures the piston rod 122 along the length of the housing 114. It follows that as the cylinder assembly 112 urges the actuator ring 28 to rotate forwardly relative to the housing rings 22, 24 to thereby urge the shoes 32 against the belt and tread package, the compression spring 216 acts between the perimeter edge 248 of the actuator ring 28 and the block-like body 190 to contribute to the pre-load force applied to the belt and tread package when the shoes 32 are moved radially inwardly of the spacing 23 to the desired radial position.

Moreover and due to the permitted (i.e. one-directional) rotational advancement of the actuator ring 28 relative to the housing rings 22, 24 due to the cooperation between the lug portions 224 and the brake racks 166, it does not matter that the block-like body 190 could pivot about the pivot axes 252 and 256 and into scotched relationship with the brake racks 166 before the target air pressure as measured within the leftward end 250 of the chamber 108 of the cylinder housing 114 is reached. If such an event were to occur, the lower end of the compression spring 216 (which will be in a compressed condition against the perimeter edge 248 of the actuator ring 28) will simply slide along the perimeter edge 248 of the actuator ring 28 as the rack-engaging surfaces 232 of the lug portions 224 slide along (rightwardly as viewed in FIG. 13) the teeth 182 of the brake racks 166.

With the belt and tread package firmly grasped by the shoes 32 and the anchoring means 132 locking the positional relationship between the ram head 118 and the cylinder housing 114, the belt and tread package can thereafter be moved to, for example, a second stage drum about which a tire carcass is positioned. During the transfer process (and before the tire carcass is inflated against the interior surfaces of the belt and tread package supported by the transfer ring 20), the belt and tread package may experience a contraction in size due, for example, hoop stress induced within the package upon buildup. However, if such an event were to occur, the radially inwardly-directed forces which are urged upon the belt and tread package by the compression spring 216 move the shoes 32 uniformly inwardly of the circular spacing 23 to thereby compensate for any contraction in size of the belt and tread package. As the actuator ring 28 is advanced relative to the housing rings 22, 24 in conjunction with the radially inwardly-directed movement of the shoes 32 during a contraction of the belt and tread package, the pivot axis 252 remains fixed in position relative to the housing rings 22, 24 (due to the anchored condition of the cylinder assembly 112), the end 194 of the block-like body 190 pivots upwardly as viewed in FIG. 13 and about the pivot axis 256 out of its meshed engagement with, or out of the scotched (FIG. 13) relationship with, the teeth-defining surfaces 180 of the brake racks 166 and into its condition of release (e.g. toward the position of the body 190 depicted in FIG. 14).

Prior to the inflation of a tire carcass within the belt and tread package grasped by the transfer ring 20, the belt and tread package is positioned over and substantially centered about a tire carcass. The tire carcass is subsequently inflated so that the tire carcass is urged against the interior surfaces of the belt and tread package. Such an inflation process tends to urge the shoes 32 of the transfer ring 20 radially outwardly and consequently tend to urge the actuator ring 28 to rotate rearwardly relative to the housing rings 22, 24. The radially outwardly-directed forces generated by these carcass-inflating pressures are referred to herein as back-driving forces and can be substantial.

However and within the transfer ring 20, the back-driving forces will only be permitted to return the shoes 32 radially outwardly relative to the circular spacing 23 from, for example, the position of the shoes 32 about the contracted condition of the belt and tread package to the radial position assumed by the shoes 32 when the shoes 32 are locked (by the anchoring means 132) in the initial desired grasping relationship about the belt and tread package. This is because that even if the package has contracted following its initial securement within the shoes 32 and the end 194 of the block-like body 190 is, for example, in the elevated condition of FIG. 14 at which the block-like body 190 is in its condition of release relative to the brake racks 166, subsequent movement of the shoes 32 radially outwardly (and the consequential rearward rotation of the actuator ring 28 relative to the housing rings 22, 24) will only permit a reverse rotation of the actuator ring 28 until such moment as the block-like body 190 is returned (by virtue of the pivotal movement of the end 194 of the block-like body 190 downwardly about the pivot axes 252 and 256) into its scotched relationship with the brake racks 166 so that any further movement of the actuator ring 28 rearwardly of the housing rings 22, 24 is prevented. The carcass-inflating pressures may generate relatively high back-driving forces for urging the shoes 32 radially outwardly, but the anchored condition of the ram head 118 and the interlocked relationship between the lug portions 224 of the intermediate assembly 130 and the brake racks 166 resist such forces and limit any radially outwardly-directed movement of the shoes 32 to the radial position that they assumed when the cylinder assembly 112 was anchored in its initial grasped condition about the belt and tread package. Therefore and throughout a carcass-inflating procedure, the size (i.e. diameter) of the belt and tread package within which the tire carcass has been inflated (and the resulting tire precursor) will be limited to the diameter possessed by the belt and tread package when the shoes 32 are initially locked in their grasped relationship about the belt and tread package. Consequently, a tire precursor formed with the transfer ring 20 is not likely to possess a size (i.e. diameter) which is too large to be subsequently fitted within a pre-sized mold.

It follows from the foregoing that the aforedescribed transfer ring 20 provides multiple advantages. Firstly, the transfer ring 20 accommodates a contraction, if necessary, of a belt and tread package even after the package has been grasped by the shoes 32 while maintaining a relatively uniformly-applied grasping force upon the package through the shoes 32 to reduce likelihood of deleterious deformation of the package. Secondly and even though the package may experience a contraction in size prior to the inflation of a tire carcass within the interior of the belt and tread package, back-driving forces generated during the tire-inflation process and which tend to urge the shoes 32 radially outwardly will only permit the shoes 32 to return radially outwardly (from a position about a contracted package) to the radial position of the shoes 32 which they assumed when the shoes 32 were initially anchored in their grasped condition about the belt and tread package. Thus, the transfer ring 20 accommodates a contraction of a grasped belt and tread package without deleterious deformation while positively establishing the maximum size (i.e. diameter) to which a belt and tread package can be inflated during a carcass-inflating process.

Another advantage of the transfer ring 20 relates to the symmetrical distribution of forces throughout the structure of the transfer ring 20 as the shoes 32 are urged radially inwardly of the transfer ring and any opposing back-driving forces are urged radially outwardly against the shoes 32. Whereas, for example, structural components present in transfer rings of the prior art may operate to transmit or withstand such forces against only one (of two) housing rings, the structural components of the transfer ring 20 operate to distribute such forces relatively evenly between the housing rings 22, 24 and are advantageous in this respect. The resultant symmetrical distribution of forces throughout the structure is believed to reduce likelihood of stress-related damage to components of the transfer ring 20 and is therefore believed to increase the useful life of the transfer ring 20.

It will be understood that numerous modifications and substitutions can be had to the aforedescribed embodiment 20 without departing from the spirit of the invention. For example, although the transfer ring 20 has been shown and described as including anchoring means 132 whose actuation is initiated as a result of a sensed target pressure within the internal chamber 108 of the cylinder housing 114, such an actuation can be initiated by an alternative event, such as the achieving of a predetermined displacement of the ram head 118 relative to the cylinder housing 114.

Accordingly, the aforedescribed embodiment 20 is intended for the purpose of illustration and not as limitation.

The invention claimed is:

1. In a transfer ring for supporting a belt and tread package in position about a tire carcass during a tire construction process as the tire carcass is inflated within the interior of the belt and tread package wherein the transfer ring includes a plurality of shoes positionable about the belt and tread package and which are movable radially inwardly and outwardly relative to the belt and tread package for purposes of grasping and releasing the outer circumference of the belt and tread package, the improvement comprising:

means for moving the shoes radially inwardly to a radial position about the outer circumference of a belt and tread package positioned within the transfer ring so that when in the radial position, the outer circumference of the belt and tread package is biased radially inwardly through by the shoes so that in the event that the belt and tread package contracts in diameter following the movement of the shoes into the radial position, the shoes are moved radially inwardly of the belt and tread package to maintain a substantially uniform grasping force about the belt and tread package; and means for preventing the shoes from moving radially outwardly of the radial position when a tire carcass is inflated within the interior of the belt and tread package grasped by the shoes to thereby prevent the diameter of the belt and tread package from enlarging beyond a desired diameter;

wherein the means for preventing includes means defining a braking surface and a body associated with the means for moving which is movable relative to the braking surface between a scotched condition at which the body is in engagement with the braking surface for preventing the movement of the shoes radially outwardly of the radial position yet permitting the movement of the shoes radially inwardly of the radial position and a condition of release at which the body is out of engagement with the braking surface so that the shoes are permitted to move radially inwardly or outwardly and the movement of the body between the scotched condition and the condition of release is coordinated with the movement of the shoes so that when the shoes are in the radial position, the body is in the scotched condition and when the shoes are disposed inwardly of the radial position, the body is in the condition of release; and wherein each of the body and the braking surface defines a series of teeth which are movable into and out of meshed relationship with the series of teeth of the other of the braking surface and the body as the body is moved into and out of its scotched condition.

2. The transfer ring as defined in claim 1 further comprising:

a pair of spaced and parallel housing rings which are maintained in a fixed positional relationship relative to one another and an actuator ring which is disposed between the housing rings and permitted to rotate forwardly and rearwardly relative thereto and a linkage system which joins the plurality of shoes to the housing rings so that rotation of the actuator ring forwardly relative to the housing rings moves the shoes radially inwardly and so that rotation of the actuator ring rearwardly relative to the housing rings moves the shoes radially outwardly, and the means for moving is adapted to act between the actuator ring and the housing rings.

3. The transfer ring as defined in claim 2 wherein the means for moving includes a cylinder assembly having a housing and a ram which is movable relative to and along the length of the housing, and the cylinder assembly is adapted to act between the housing rings and the actuator ring so that by moving the ram in one direction along the length of the housing, the actuator ring is rotated forwardly relative to the housing rings and by moving the ram in the other direction along the length of the housing, the actuator ring is rotated rearwardly relative to the housing rings, and the transfer ring further includes
 means for anchoring the position of the ram relative to the housing upon movement of the shoes radially inwardly to the radial position about the belt and tread package.

4. The transfer ring as defined in claim 3 wherein the body is pivotally connected to the cylinder assembly for pivotal movement with respect thereto about a first pivot axis and wherein the body is pivotally connected to the actuator ring for pivotal movement with respect thereto about a second pivot axis, and so that the movement of the body between the scotched condition and the condition of release pivots the body about each of the first and second axes of pivot.

5. The transfer ring as defined in claim 4 wherein the means for moving includes biasing means for acting between the cylinder assembly and the actuator ring for urging the body to pivot from the scotched condition toward the condition of release so that upon movement of the shoes radially inwardly of a belt and tread package by way of the cylinder assembly to the radial position thereabout, the body is disposed in its scotched condition and urged toward its condition of release by the biasing means, and so that the radially inwardly-directed forces exerted upon the outer circumference of the belt and tread package through the shoes when the shoes are disposed in the radial position include the forces exerted by the biasing means to urge the body from its scotched condition toward its condition of release.

6. The transfer ring as defined in claim 5 wherein the body is adapted to pivot out of its scotched condition as the actuator ring is rotated forwardly relative to the housing means in conjunction with the movement of the shoes radially inwardly of the radial position during a contraction of the belt and tread package so that during a contraction of the belt and tread package, the radially inwardly-directed forces exerted upon the belt and tread package through the shoes are maintained upon the belt and tread package by the biasing means.

7. The transfer ring as defined in claim 6 wherein the biasing means includes a compression spring for acting between the body and the actuator ring.

8. In a transfer ring for transporting a belt and tread package in position about a tire carcass and for holding the belt and tread package in position as the tire carcass is inflated within the interior of the belt and tread package during a tire construction process wherein the transfer ring includes a plurality of shoes which collectively define a spacing for accepting a belt and tread package positioned therein and which are movable radially inwardly and outwardly with respect to the spacing for purposes of grasping and releasing the outer circumference of a belt and tread package positioned within the spacing, the improvement comprising:
 means for moving the shoes radially inwardly of the spacing to a radial position about a belt and tread package positioned within the spacing at which radial position the shoes engage the outer circumference of the belt and tread package and apply thereto a radially inwardly-directed biasing force about the belt and tread package and wherein said means for moving maintains a substantially uniform inwardly-directed pressure about the belt and tread package through the shoes in the event that the belt and tread package contracts in diameter subsequent to the movement of the shoes radially inwardly to the radial position about the belt and tread package; and
 means for preventing the shoes from moving radially outwardly of the radial position when a tire carcass is inflated within the interior of the belt and tread package grasped by the shoes to thereby limit the diameter of the belt and tread package to that possessed thereby when the shoes are moved radially inwardly to said radial position about the belt and tread package wherein the means for preventing includes means defining a braking surface and a body associated with the means for moving which is movable relative to the braking surface between a scotched condition at which the body is in engagement with the braking surface for preventing the movement of the shoes radially outwardly of the radial position yet permitting the movement of the shoes radially inwardly of the radial position and a condition of release at which the body is out of engagement with the braking surface so that the shoes are permitted to move radially inwardly or outwardly and
 the movement of the body between the scotched condition and the condition of release is coordinated with the radial movement of the shoes so that when the shoes are in the radial position, the body is in the scotched condition and when the shoes are disposed inwardly of the radial position, the body is in the condition of release and
 wherein each of the body and the braking surface defines a series of teeth which are movable into and out of meshed relationship with the series of teeth of the other of the braking surface and the body as the body is moved into and out of its scotched condition.

9. The transfer ring as defined in claim 8 including biasing means for continually biasing the shoes radially inwardly of the spacing from the moment that the shoes are disposed in the radial position about the belt and tread package so that in the event that the belt and tread package contracts in diameter subsequent to the movement of the shoes radially inwardly to the radial position, the shoes are urged radially inwardly by the biasing means to maintain the substantially uniform inwardly-directed pressure about the belt and tread package and
 the means for preventing cooperates with the biasing means so that radially outwardly-directed forces which are generated by the subsequent inflation of a tire carcass within the interior of the belt and tread package and which are in opposition to the force of the biasing means are only permitted to move the shoes radially outwardly of the spacing to said radial position.

10. The transfer ring as defined in claim 8 further including
 a pair of spaced and parallel housing rings which are maintained in a fixed positional relationship relative to one another and an actuator ring which is disposed between the housing rings and permitted to rotate forwardly and rearwardly relative thereto and
 a linkage system which joins the plurality of shoes to the housing rings so that rotation of the actuator ring forwardly relative to the housing rings moves the shoes radially inwardly of the spacing and so that rotation of the actuator ring rearwardly relative to the housing rings moves the shoes radially outwardly of the spacing, and
 the means for moving is adapted to act between the actuator ring and the housing rings.

11. The transfer ring as defined in claim 10 wherein the body which is associated with the means for moving is movable relative to the braking surface between a scotched condition at which the body is in engagement with the braking surface for preventing the rotational movement of the actuator ring rearwardly of the housing rings yet permitting the rotational movement of the actuator ring forwardly relative to the housing rings and a condition of release at which the body is out of engagement with the braking surface so that the actuator ring is permitted to rotate forwardly or rearwardly relative to the housing rings.

12. The transfer ring as defined in claim 11 wherein the means for moving includes a cylinder assembly having a housing and a ram which is movable relative to and along the length of the housing, and the cylinder assembly is adapted to act between the housing rings and the actuator ring so that by moving the ram in one direction along the length of the housing, the actuator ring is rotated forwardly relative to the housing rings and by moving the ram in the other direction along the length of the housing, the actuator ring is rotated rearwardly relative to the housing rings, and the transfer ring further includes
    means for anchoring the position of the ram relative to the housing upon movement of the shoes radially inwardly to the radial position about the belt and tread package.

13. The transfer ring as defined in claim 12 wherein the body is connected to the cylinder assembly to accommodate a pivotal movement of the body relative thereto about a first axis of pivot, the body is connected to the actuator ring to accommodate a pivotal movement of the body relative thereto about a second axis of pivot and so that the movement of the body between the scotched condition and the condition of release pivots the body about each of the first and second axes of pivot, and the transfer ring includes
    a compression spring for acting between the actuator ring and the body for urging the body to pivot out of the scotched condition and so the radially inwardly-directed force exerted upon the belt and tread package when the shoes are in the radial position includes the force applied between the actuator ring and the body by the compression spring.

14. The transfer ring of claim 13 wherein the first and second pivot axes are disposed in such a relation with one another so that actuation of the cylinder assembly for rotatably moving the actuator ring forwardly relative to the housing rings pivots the body about both the first and second axes of pivot in opposition to the force applied between the actuator ring and the body by the compression spring.

15. A transfer ring for use during a tire manufacturing process involving the support of a belt and tread package in position about a tire carcass for purposes of inflating the tire carcass against the interior of the belt and tread package, the transfer ring comprises:
    a plurality of shoes which are movable radially inwardly and outwardly for grasping or releasing the outer circumference of a belt and tread package;
    a pair of spaced and parallel housing rings which are maintained in a fixed positional relationship with one another;
    an actuator ring disposed between the housing rings and permitted to rotate with respect thereto between alternative rotational positions;
    a linkage system which joins the plurality of shoes to the housing rings and the actuator ring so that rotation of the actuator ring in one rotational direction relative to the housing rings moves the shoes radially inwardly and rotation of the actuator ring in the opposite rotational direction relative to the housing rings moves the shoes radially outwardly;
    a cylinder assembly for rotating the actuator ring in the one and the other rotational directions relative to the housing rings wherein the cylinder assembly includes a housing and a ram which is movable relative to and along the length of the housing, and the housing and the ram are adapted to act between the housing rings and the actuator ring so that by moving the ram in one direction along the length of the housing, the actuator ring is rotated in a forward direction relative to the housing rings for movement of the shoes radially inwardly and by moving the ram in the other direction along the length of the housing, the actuator ring is rotated rearwardly relative to the housing rings for movement of the shoes radially outwardly;
    means for anchoring the position of the ram relative to the housing after the actuator ring has been rotated in the one rotational direction relative to the housing rings to a condition at which the shoes are disposed in a radial position about the belt and tread package;
    means for preventing the shoes from moving radially outwardly of the radial position when a tire carcass is subsequently inflated within the interior of a belt and tread package grasped by the shoes wherein the means for preventing includes:
    a) means defining a braking surface which is disposed in a stationary relationship relative to the housing rings and
    b) a body associated with the cylinder assembly which is movable relative to the braking surface between a scotched condition at which the body is in engagement with the braking surface for preventing the rotational movement of the actuator ring rearwardly of the housing rings yet permitting the rotational movement of the actuator ring forwardly relative to the housing rings and a condition of release at which the body is out of engagement with the braking surface so that the actuator ring is permitted to rotate forwardly or rearwardly relative to the housing rings and
    the movement of the body between the scotched condition and the condition of release is coordinated with the radial inwardly and outwardly movement of the shoes so that when the shoes are in the radial position, the body is in the scotched condition and when the shoes are disposed inwardly of the radial position, the body is in the condition of release; and
    wherein each of the body and the braking surface defines a series of teeth which are movable into and out of meshed relationship with the series of teeth of the other of the braking surface and the body as the body is moved into and out of its scotched condition.

16. The transfer ring as defined in claim 15 wherein each shoe moves closer to its adjacent shoe as the shoes are moved radially inwardly and each shoe moves further from its adjacent shoe as the shoes are moved radially outwardly, and the transfer ring further includes:
    a two bar linkage arrangement connected between adjacent shoes of the transfer ring wherein the two bar linkage arrangement includes two bars which are pivotally connected to one another and which are each connected to a corresponding shoe of the adjacent shoes so that movement of the shoes radially inwardly and outwardly effects movement of the two bar linkage arrangement in a pincer-like fashion.

17. In a transfer ring having a plurality of shoes collectively defining a spacing within which a belt and tread package is positionable and which are capable of grasping the outer surface of a belt and tread package positioned within the spacing during a tire-making process, the improvement comprising:

> a pair of spaced and parallel outer housing rings which are maintained in a fixed positional relationship with one another;
> an actuator ring disposed between the outer housing rings and permitted to rotate relative thereto between alternative angular positions;
> a linkage system which joins the plurality of shoes to the housing rings and the actuator ring so that rotation of the actuator ring in one rotational direction relative to the housing rings moves the shoes radially inwardly of the spacing defined thereby and rotation of the actuator ring in the opposite rotational direction relative to the housing rings moves the shoes radially outwardly of the spacing defined thereby;
> a brake rack arrangement secured to the housing rings and defining an elongated braking surface which extends along the housing rings;
> a cylinder assembly for rotating the actuator ring in the one and the other rotational directions relative to the housing rings wherein the cylinder assembly includes a housing and a ram which is movable relative to and along the length of the housing, and the cylinder housing and the ram are adapted to act between the housing rings and the actuator ring so that by moving the ram in one direction along the length of the housing, the actuator ring is rotated in a forward direction relative to the housing rings for movement of the shoes radially inwardly and by moving the ram in the other direction along the length of the housing, the actuator ring is rotated rearwardly relative to the housing rings for movement of the shoes radially outwardly;
> means for anchoring the position of the ram relative to the housing after the actuator ring has been rotated in the one rotational direction relative to the housing rings to a condition at which the shoes are disposed in a radial position about the belt and tread package;
> a body which is connected to the cylinder assembly for pivotal movement relative thereto about a first pivot axis and which is connected to the actuator ring for pivotal movement relative thereto about a second pivot axis wherein the body is movable relative to the braking surface of the brake rack arrangement between a scotched condition at which the body is in engagement with the braking surface for preventing the movement of the shoes radially outwardly of the radial position yet permitting the movement of the shoes radially inwardly of the radial position to accommodate the movement of the shoes radially inwardly in the event of a contraction of the belt and tread package and a condition of release at which the body is out of engagement with the braking surface so that the shoes are permitted to move radially inwardly or outwardly and
> the movement of the body between the scotched condition and the condition of release is coordinated with the movement of the shoes so that when the shoes are in the radial position, the body is in the scotched condition to thereby prevent the shoes from moving radially outwardly of the radial position when a tire carcass is inflated within the interior of the belt and tread package and when the shoes are disposed inwardly of the radial position, the body is in the condition of release; and
> means for biasing the body away from the braking surface so that upon anchoring the position of the ram relative to the housing when the shoes are moved inwardly to the radial position, the shoes continue to be urged radially inwardly against the belt and tread package by the biasing means and so that when the body is in the condition of release, the shoes are permitted to be moved radially inwardly in conjunction with the contraction of the belt and tread package while the shoes maintain a substantially uniform grasping force about the belt and tread package under the force of the biasing means.

18. In a transfer ring positionable about the outer circumference of a belt and tread package and including a plurality of shoes positionable about the belt and tread package and which are movable radially inwardly and outwardly relative to the belt and tread package for purposes of grasping and releasing the outer circumference of the belt and tread package and wherein each shoe of the plurality of shoes moves closer to its adjacent shoe as the shoes are moved radially inwardly and each shoe moves further from its adjacent shoe as the shoes are moved radially outwardly, the improvement comprising:

> a two bar linkage arrangement connected between adjacent shoes of the transfer ring wherein the two bar linkage arrangement includes two bars which are pivotally connected to one another and which are each connected to a corresponding shoe of the adjacent shoes so that movement of the shoes radially inwardly and outwardly effects movement of the two bar linkage arrangement in a pincer-like fashion and about a pivot axis which extends substantially radially of the belt and tread package and so that the movement of the two bars of the two bar linkage arrangement relative to one another is substantially confined to a plane which is oriented tangential to the belt and tread package.

* * * * *